US007783884B2

(12) United States Patent
Nakano et al.

(10) Patent No.: US 7,783,884 B2
(45) Date of Patent: Aug. 24, 2010

(54) CONTENT PROVIDING SYSTEM, INFORMATION PROCESSING DEVICE AND MEMORY CARD

(75) Inventors: Toshihisa Nakano, Osaka (JP); Motoji Ohmori, Osaka (JP); Shunji Harada, Osaka (JP)

(73) Assignee: Panasonic Corporation, Osaka (JP)

( * ) Notice: Subject to any disclaimer, the term of this patent is extended or adjusted under 35 U.S.C. 154(b) by 738 days.

(21) Appl. No.: 11/578,672

(22) PCT Filed: Apr. 15, 2005

(86) PCT No.: PCT/JP2005/007318

§ 371 (c)(1),
(2), (4) Date: Jun. 15, 2007

(87) PCT Pub. No.: WO2005/104431

PCT Pub. Date: Nov. 3, 2005

(65) Prior Publication Data

US 2007/0283151 A1   Dec. 6, 2007

(30) Foreign Application Priority Data

Apr. 21, 2004   (JP)   .............................. 2004-125197

(51) Int. Cl.
*H04L 9/32*   (2006.01)
*G06F 12/14*   (2006.01)
(52) U.S. Cl. ...................... 713/175; 713/194
(58) Field of Classification Search ................. 713/168, 713/194, 175
See application file for complete search history.

(56) References Cited

U.S. PATENT DOCUMENTS

| 5,701,343 | A | 12/1997 | Takashima et al. | |
|---|---|---|---|---|
| 6,085,320 | A * | 7/2000 | Kaliski, Jr. | 713/168 |
| 7,409,554 | B2 * | 8/2008 | Ishibashi et al. | 713/175 |
| 2002/0157002 | A1 * | 10/2002 | Messerges et al. | 713/155 |
| 2003/0037264 | A1 | 2/2003 | Ezaki et al. | |
| 2003/0105956 | A1 * | 6/2003 | Ishiguro et al. | 713/158 |
| 2005/0105735 | A1 | 5/2005 | Iino et al. | |
| 2005/0251677 | A1 * | 11/2005 | Maeda et al. | 713/165 |

FOREIGN PATENT DOCUMENTS

| JP | 08-160855 | 6/1996 |
|---|---|---|
| JP | 11-234259 | 8/1999 |
| JP | 2003-058509 | 2/2003 |
| JP | 2003-085493 | 3/2003 |
| JP | 2004-040660 | 2/2004 |
| JP | 2004-048660 | 2/2004 |

OTHER PUBLICATIONS

Author: Alfred j. Menezes et al. Title: Handbook of applied cryptography date: 1997 Publisher: CRC Press LLC.*

* cited by examiner

*Primary Examiner*—Minh Dieu Nguyen
(74) *Attorney, Agent, or Firm*—Wenderoth, Lind & Ponack, L.L.P.

(57) ABSTRACT

A memory card 10 inserted in a terminal device 20 establishes a SAC with each of a content server 1, a content server 2, a settlement server 1 and a settlement server 2, using an application program corresponding to the server, to securely receive and transmit data. The memory card 10 acquires a unique private key and a unique public key for each application program, and establishes a SAC with each server using the acquired private key and public key.

10 Claims, 27 Drawing Sheets

FIG.3

120 INITIAL CERTIFICATION

| DEVICE ID | ID_0010 | 121 |
| PUBLIC KEY | PK_0010 | 122 |
| SIGNATURE DATA | Sig_0010CA | 123 |

FIG.4

125 CRL

| IDs OF INVALIDATED DEVICES |
| --- |
| ID_0012 |
| ID_0058 |
| ID_0379 |
| ⋮ |

FIG.5A

| | | |
|---|---|---|
| SERVICE ID | SID_0123A | 131 |
| MEMBERSHIP NUMBER | NO_0010 | 132 |
| PUBLIC KEY | PK_A | 133 |
| SIGNATURE DATA 1 | Sig_0010A | 134 |

130 Cert_A

FIG.5B

| | | |
|---|---|---|
| SERVICE ID | SID_0123A | 131 |
| MEMBERSHIP NUMBER | NO_0010 | 132 |
| PUBLIC KEY | PK_A | 133 |
| SIGNATURE DATA 1 | Sig_0010A | 134 |
| SIGNATURE DATA 2 | Sig_ASDeX | 136 |

135 Cert_A'

FIG.7A

150 Cert_C

| SERVICE ID | SID_0123C | 151 |
|---|---|---|
| MEMBERSHIP NUMBER | NO_0025 | 152 |
| PUBLIC KEY | PK_C | 153 |
| SIGNATURE DATA 1 | Sig_0010C | 154 |

FIG.7B

155 Cert_C'

| SERVICE ID | SID_0123C | 151 |
|---|---|---|
| MEMBERSHIP NUMBER | NO_0025 | 152 |
| PUBLIC KEY | PK_C | 153 |
| SIGNATURE DATA 1 | Sig_0010C | 154 |
| SIGNATURE DATA 2 | Sig_CSDeX | 156 |

FIG.8A

160 Cert_D

| SERVICE ID | SID_0321D | 161 |
| --- | --- | --- |
| MEMBERSHIP NUMBER | NO_0025 | 162 |
| PUBLIC KEY | PK_D | 163 |
| SIGNATURE DATA 1 | Sig_0010D | 164 |

FIG.8B

165 Cert_D'

| SERVICE ID | SID_0321D | 161 |
| --- | --- | --- |
| MEMBERSHIP NUMBER | NO_0025 | 162 |
| PUBLIC KEY | PK_D | 163 |
| SIGNATURE DATA 1 | Sig_0010D | 164 |
| SIGNATURE DATA 2 | Sig_DSDeX | 166 |

FIG.13A

310 INITIAL CERTIFICATION (Cert_0030)

| DEVICE ID | ID_0030 |
| PUBLIC KEY | PK_0030 |
| SIGNATURE DATA | Sig_0030CA |

FIG.13B

320 INITIAL CERTIFICATION (Cert_0040)

| DEVICE ID | ID_0040 |
| PUBLIC KEY | PK_0040 |
| SIGNATURE DATA | Sig_0040CA |

FIG.13C

340 INITIAL CERTIFICATION (Cert_0050)

| DEVICE ID | ID_0050 |
| PUBLIC KEY | PK_0050 |
| SIGNATURE DATA | Sig_0050CA |

FIG.13D

360 INITIAL CERTIFICATION (Cert_0060)

| DEVICE ID | ID_0060 |
| PUBLIC KEY | PK_0060 |
| SIGNATURE DATA | Sig_0060CA |

FIG.14

| SERVICE ID | MEMBERSHIP NUMBER | USAGE NUMBER | AMOUNT OF MONEY | DATE OF USE |
|---|---|---|---|---|
| SID_0123A | NO_0010 | 0322001 | 1200 | 2005/3/22 |

410 SETTLEMENT REQUEST INFORMATION

FIG.15

| SERVICE ID | MEMBERSHIP NUMBER | SETTLEMENT NUMBER | AMOUNT OF MONEY | DATE OF USE |
|---|---|---|---|---|
| SID_0321B | NO_0010 | 0322001 | 1200 | 2005/3/22 |

420 ELECTRONIC RECEIPT

CONTENT PROVIDING SYSTEM, INFORMATION PROCESSING DEVICE AND MEMORY CARD

TECHNICAL FIELD

The present invention relates to a technique for realizing safe and secure transmission and reception of contents, and particularly relates to a technique to receive provided contents using a memory card.

BACKGROUND ART

When a device uses services provided by a content provider, the device and a server belonging to the content provider perform mutual authentication. If the mutual authentication succeeds, the device and the server share a key, and thereby establish a so-called SAC (Secure Authentication Channel), which is a secure data transmission channel. The device and the server transmit and receive contents to and from each other via the SAC. Such a technique is disclosed by Patent Document 1.

In recent years, the number of content service providers has been increasing. Therefore, there are demands for a system that supports the case where a single device uses services provided by a plurality of content providers.

Patent Document 1: Japanese Laid-open Patent Document No. 11-234259;

Non-patent Document 1: "Gendai Ango Riron (Modern Encryption Theory)" written by Shinichi Ikeno and Kenji Koyama, and published by the Institute of Electronics and Communication Engineer.

DISCLOSURE OF THE INVENTION

Problem to be Solved by the Invention

In such a case, a pair of a single private key and a single public key is assigned to a device. Therefore, in the case of establishing SACs with a plurality of server devices using the single pair to use a plurality of services, if the private key is exposed and invalidated, this affects all the services.

The present invention is made to solve this problem. The object of the present invention is to provide a highly secure system by which, even if a private key is exposed and invalidated in the case of using a plurality of services using a single device, the effect of such exposure and invalidation can be suppressed to the minimum.

Means for Solving the Problem

To solve the above-described problem, the present invention provides an information processing device that receives services from at least one server connected thereto via a network, using an application program that securely communicates with the server, the information processing device comprising: a storing unit that stores a plurality of application programs and pieces of key information respectively associated with the application programs; and a program execution unit operable to read one of the application programs and execute the read application program, wherein the program execution unit reads, from the storing unit, one of the pieces of key information associated with the read application program, and securely communicates with the server using the read piece of key information.

ADVANTAGEOUS EFFECT OF THE PRESENT INVENTION

With the stated structure, the information processing device uses a unique piece of key information for each application program. Accordingly, even if a piece of key information for one application program is invalidated, the information processing device still can use the other pieces of key information for the other application programs. With such an information processing device, it is possible to structure a secure system even in the case where a single information processing device receives services from a plurality of servers, using a plurality of applications.

The information processing device may be a memory card comprising a CPU, and the memory card may be to be attached to a terminal device that is connected to a network, to receive the services from the server via the terminal device.

With the stated structure, it is possible to structure a secure system as described above, using a memory instead of the information processing device.

Each application program may include: a key sharing program for securely sharing a shared key with the server; a communication program for receiving and transmitting data encrypted based on the shared key from and to the server; and an encryption program for encrypting data to be transmitted and decrypting received data, wherein the program execution unit may execute the key sharing program, the communication program and the encryption program to securely share the shared key with the server based on the read piece of key information, transmit and receive data encrypted based on the shared key to and from the server, and encrypt data to be transmitted to the server and decrypt data received from the server.

With the stated structure, the information processing device and the memory card is capable of establishing a SAC with the server, using a different piece of key information for each application program, to securely receive and transmit data.

Each piece of key information stored in the storing unit may be a key set including a pair of a private key and a public key used in a public key cryptosystem, the key sharing program may be for sharing the shared key based on the public key cryptosystem, and the program execution unit may use the public key cryptosystem to share the shared key.

With the stated structure, the information processing device and the memory card are capable of securely communicating with the server, using a public key cryptosystem as an encryption algorithm.

The information processing device may further comprise: a private key acquiring unit operable to generate or receive private keys respectively corresponding to the application programs stored in the storing unit, and write the private keys in the storing unit; a public key acquiring unit operable to generate or receive public keys respectively corresponding to the private keys; a public key transmitting unit operable to transmit the public keys to the server from which the information processing device receives the services using the application programs respectively corresponding to the transmitted public keys; and a public key certification acquiring unit operable to acquire a plurality of public key certifications from the server and write the public key certifications in the storing unit, wherein the key set stored in the storing unit may include the private key acquired by the private key acquiring unit and the public key acquired by the public key acquiring unit.

With the stated structure, the information processing device and the memory card are capable of more secure communication with the server by acquiring a piece of signature data from a corresponding server for a public key of each application program.

The storing unit may further store an initial private key that is unique to the information processing device, and an initial certification that includes a public key corresponding to the initial private key and signature data issued by a certificate authority relating to the public key, the public key transmitting unit may use the initial private key and the initial certification to securely transmit the public keys to the server, and the public key certification acquiring unit may use the initial private key and the initial certification to securely receive the public key certifications from the server.

With the stated structure, the information processing device and the memory card store an initial private key and an initial certification which are bases for all the application programs. Using the initial private key and the initial certification, the information processing device and the memory card are capable of establishing a SAC with the server and securely receiving the public key certification.

The public key certification acquiring unit may generate signature data based on the initial private key, add the generated signature data to the public key certifications received from the server, and store the public key certifications in the storing unit. Also, the public key certification acquiring unit may judge whether to add signature data of the information processing device, and if judging affirmatively, generate the signature data based on the initial private key, add the generated signature data to the public key certifications, and store the public key certifications in the storing unit.

With the stated structure, the information processing device authenticate the information processing device itself by transmitting the public key certification to the server after adding signature data of itself to the public key certification received from the server.

The storing unit may include: an internal memory that is tamper resistant and accessible by only the CPU included within the memory card; an authentication area that requires authentication for an access by the terminal device; and an non-authentication area that does not require authentication for an access by the terminal device. If this is the case, the initial private key may be stored in the internal memory, the private key may be stored in the authentication area, and the initial certification and the public key certification may be stored in the non-authentication area.

With the stated structure, the memory card is capable of storing the private key, the public key certification, the initial private key and the initial certification in different storing areas according to the security level. As a result, it is possible to effectively use the storing areas having different security levels.

BRIEF DESCRIPTION OF THE DRAWINGS

FIG. 3 shows a data structure of an initial certification Cert_0010 (120) that a memory card 10 receives from a certificate authority 70;

FIG. 4 shows a data structure of a CRL 125 stored in a memory card 10;

FIG. 5A shows a data structure of a Cert_A (130) that a memory card 10 receives from a content server 1 (30);

FIG. 5B shows a data structure of a Cert_A' (135) that is stored in a user area 116 of a memory card 10;

FIG. 7A shows a data structure of a Cert_C (150) that a memory card 10 receives from a content server 2 (50);

FIG. 7B shows a data structure of Cert_C' (155) that is stored in a user area 116 of a memory card 10;

FIG. 8A shows a data structure of a Cert_D (160) that a memory card 10 receives from a settlement server 2 (40);

FIG. 8B shows a data structure of Cert_D' (165) that is stored in a user area 116 of a memory card 10;

FIG. 13A shows a data structure of an initial certification Cert_0030 (310) that the content server 1 (30) receives from certificate authority 70;

FIG. 13B shows a data structure of an initial certification Cert_0040 (320) that the settlement server 1 (40) receives from certificate authority 70;

FIG. 13C shows a data structure of an initial certification Cert_0050 (350) that the content server 2 (50) receives from certificate authority 70;

FIG. 13D shows a data structure of an initial certification Cert_0060 (360) that the settlement server 2 (60) receives from certificate authority 70;

FIG. 14 shows a data structure of settlement request information 410 that a content server 1 (30) transmit to a settlement server 1 (40);

FIG. 15 shows a data structure of a electronic receipt that a settlement server 1 (40) transmits to a memory card 10;

EXPLANATION OF REFERENCES

1 CONTENT PROVIDING SYSTEM
10 MEMORY CARD
20 TERMINAL DEVICE
30 CONTENT SERVER 1
40 CONTENT SERVER 2
50 SETTLEMENT SERVER 1
60 SETTLEMENT SERVER 2
70 CERTIFICATE AUTHORITY
80 NETWORK
101 INPUT/OUTPUT UNIT
102 CONTROL UNIT
103 TRM
104 STORING UNIT
105 COMMAND PROCESSING UNIT
106 AUTHENTICATION UNIT
107 PUBLIC KEY ENCRYPTION UNIT
108 DECRYPTION UNIT
109 ACCESS CONTROL UNIT
111 TRM INPUT/OUTPUT UNIT
112 TRM CONTROL UNIT
113 INTERNAL MEMORY INPUT/OUTPUT UNIT
114 INTERNAL MEMORY
115 SECURE AREA
116 USER AREA
201 COMMUNICATION UNIT
202 OPERATION INPUT UNIT
203 CONTROL UNIT
204 MEMORY CARD INPUT/OUTPUT UNIT
205 AUTHENTICATION UNIT
206 PLAYBACK UNIT
301 COMMUNICATION UNIT
302 CONTROL UNIT
303 CRL STORING UNIT
304 Cert MANAGING UNIT
305 REGISTRATION INFORMATION MANAGING UNIT
306 PUBLIC KEY ENCRYPTION UNIT
307 ENCRYPTED CONTENT STORING UNIT
308 CONTENT KEY STORING UNIT
401 COMMUNICATION UNIT
402 CONTROL UNIT
403 CRL STORING UNIT
404 Cert MANAGING UNIT
405 PUBLIC KEY ENCRYPTION UNIT
406 SETTLEMENT UNIT
1000 LSI

BEST MODE FOR CARRYING OUT THE INVENTION

First Embodiment

The following describes a content providing system 1 as an embodiment of the present invention, with reference to drawings.

<Structure>

The following describes a structure of the content providing system 1.

Figure 1:
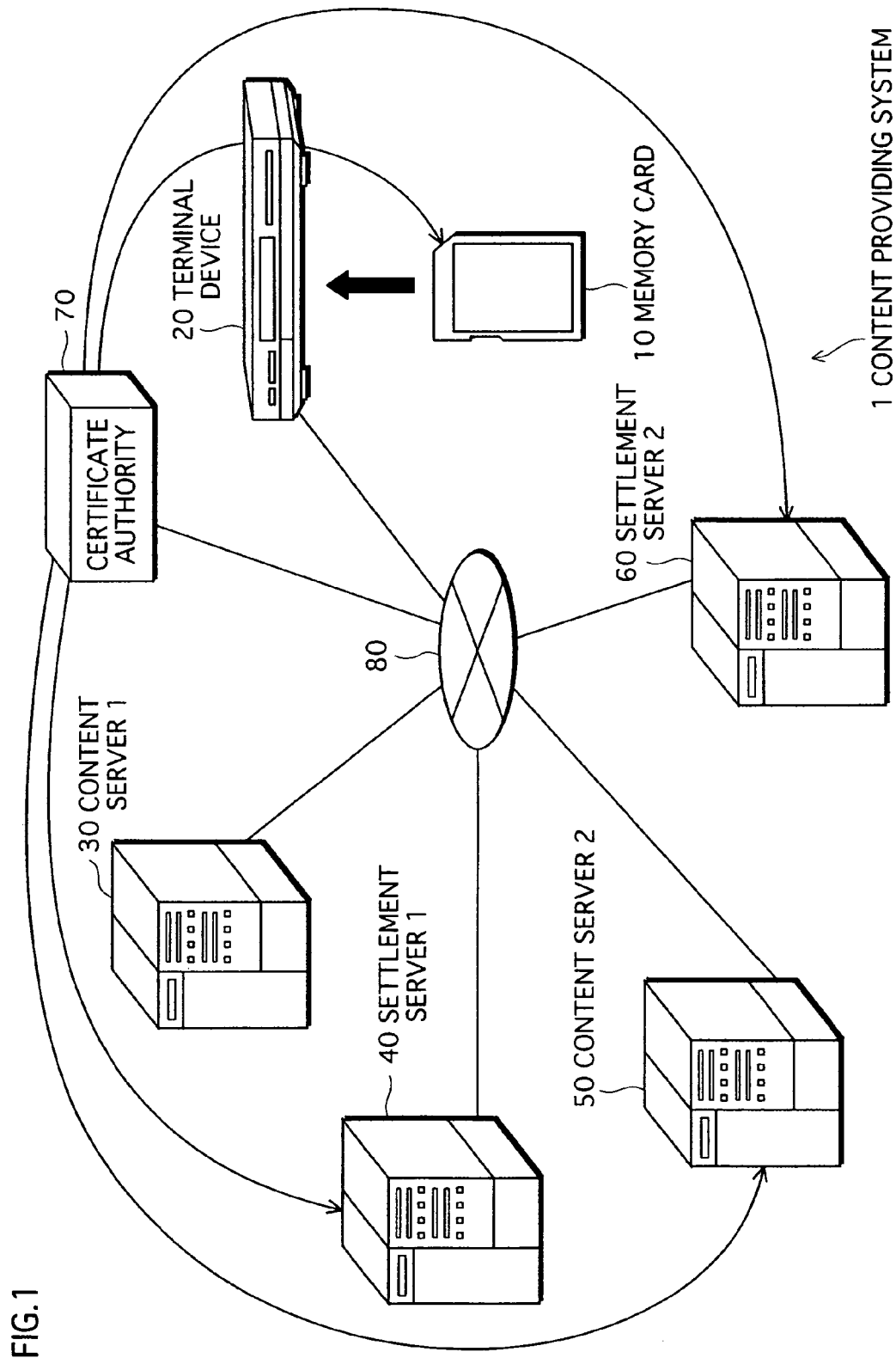
FIG. 1 shows a system structure of a content providing system 1.

FIG. 1 shows a system structure of the content providing system 1. As FIG. 1 shows, the content providing system 1 includes a memory card 10, a terminal device 20, a content server 1 (30), a settlement server 1 (40), a content server 2 (50), a settlement server 2 (60) and a certificate authority 70.

The memory card is inserted in the terminal device 20 when used. The terminal device 20, the content server 1 (30), the settlement server 1 (40), the content server 2 (50), the settlement server 2 (60) and the certificate authority 70 are connected with a network 80. Therefore, the memory card 10 and each server and the certificate authority 70 can perform mutual communications via the terminal device 20 and the network 80. The Internet is a representative example of the network 80. However, the network 80 is not limited to the Internet, and may be an analogue broadcast network, a BS digital broadcast network, a terrestrial digital broadcast network, or a CATV network.

The content providing system 1 is a system that uses a memory card 10 inserted in the terminal device 20 to use services provided by a plurality of content providers.

The content server 1 (30) and the content server 2 (50) belong to different content providers respectively. The settlement server 1 (40) performs settlement of payments for contents that the memory card 10 has obtained from the content server 1. The settlement server 2 (60) performs settlement of payments for contents that the memory card 10 has been obtained from the content server 2.

The following describes the details of each device included in the system.

1. Memory Card 10

A structure of the memory card 10 is described in this section.

The memory card 10 is an IC memory card equipped with a CPU, and having three storage areas each having a different security level. Specifically, the memory card 10 has a user area, a secure area and a TRM (Tamper Resistant Module). The user area is accessible by any external devices, such as the terminal device 20. The secure area is accessible by only a device that has been successfully authenticated. The TRM is inaccessible by any external device, since the existence of the TRM is unknown to any external device.

Figure 2:
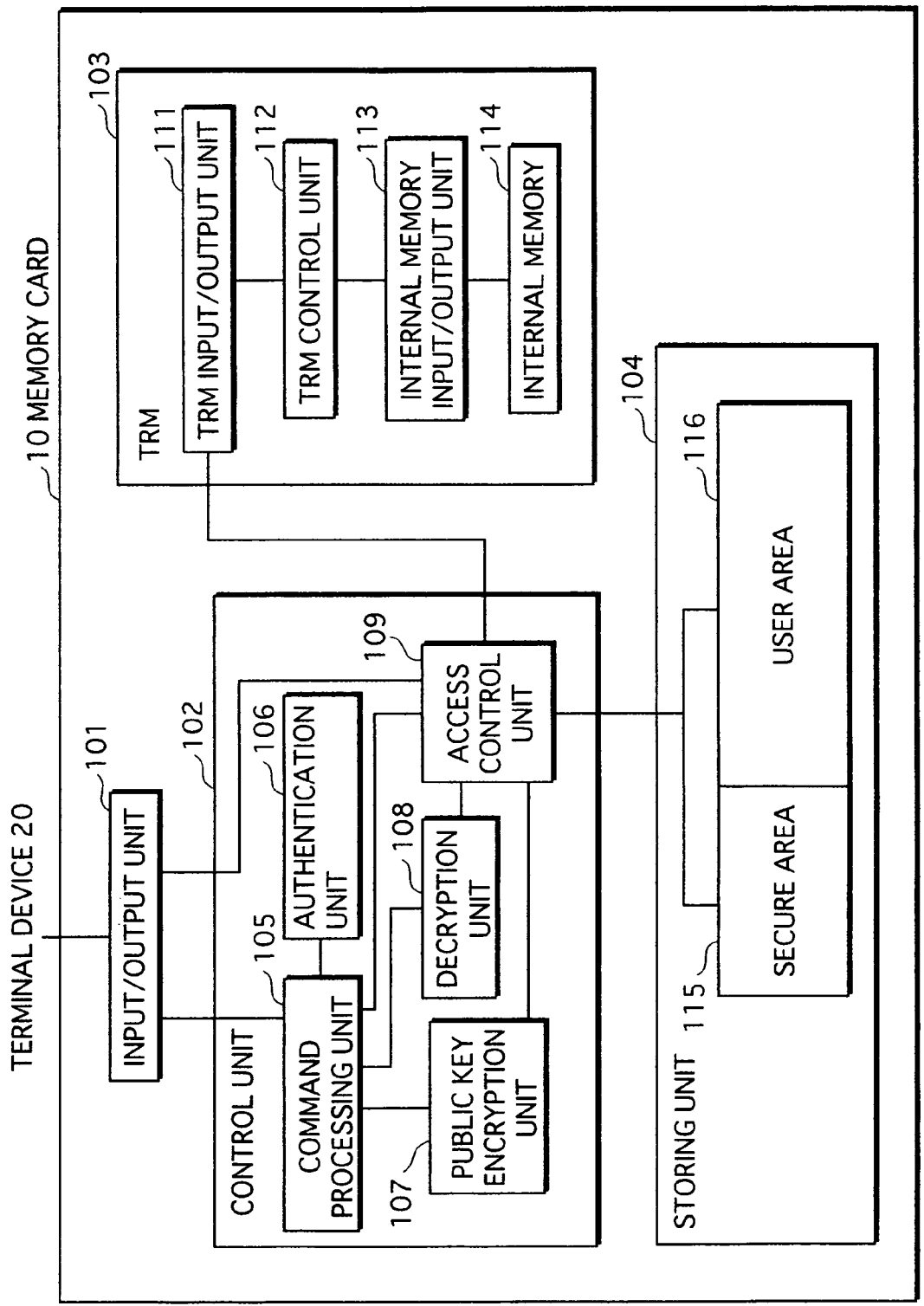
FIG. 2 is a functional block diagram showing a structure of a memory card 10.

FIG. 2 is a functional block diagram functionally showing a structure of the memory card 10. As FIG. 2 shows, the memory card 10 includes an input/output unit 101, a control unit 102, a TRM 103, and a storing unit 104.

The control unit 102 further includes a command processing unit 105, an authentication unit 106, a public key encryption unit 107, a decryption unit 108 and an access control unit 109. The TRM 103 includes a TRM input/output unit 111, a TRM control unit 112, an internal memory input/output unit 113, and an internal memory 114. The memory unit 104 includes a secure area 115 and a user area 116.

(1) Input/Output Unit 101

The input/output unit 101 has a plurality of pin terminals. In a state where the memory card 10 is inserted in a memory card input/output unit 204 of the terminal device 20 which is described later, the input/output unit 101 performs input and output of commands and data from and to the terminal device 20 via the pin terminals.

Specifically, the input/output unit 101 outputs commands received from the memory card input/output unit 204 of the terminal device 20 to the command processing unit 105 of the control unit 102, and outputs data received from the memory card input/output unit 204 to the access control unit 109.

The input/output unit 101 also outputs data received from the access control unit 109 of the control unit 102 to the memory card input/output unit 204 of the terminal device 20.

(2) Control Unit 102

The control unit 102 establishes a SAC with each server via the terminal device 20 and the network 80. The control unit 102 also controls accesses by the terminal device 20 to the TRM 103 and the storing unit 104. The following describes the details of the control unit 102.

(a) The command processing unit 105 receives a command via the input/output unit 101, interprets the command, and performs processing in accordance with the command.

For example, the command processing unit 105 instructs the authentication unit 106 to perform authentication processing, instructs the public key encryption unit 107 to establish a SAC, instructs the decryption unit 108 to decrypt an encrypted content, encrypted payment amount notifying information and an encrypted electronic receipt, instructs the decryption unit 108 to decrypt an encrypted content, and instructs the access control unit 109 to read an application program.

(b) The authentication unit 106 stores password information PW_0 previously registered by the terminal device 20. Upon receiving an instruction from the command processing unit 105, the authentication unit 106 authenticates a device in which the memory card 10 is inserted, in the following manner.

The authentication unit 106 generates a 56-bit random number R_0, and outputs the generated random number R_0 to the terminal device 20 via the input/output unit 101. Also, using the random number R_0 as an encryption key, the authentication unit 106 applies an encryption algorithm E to the PW_0 to generate an encrypted text E1, and stores therein the generated encrypted text E1. Here, a DES (Data Encryption Standard) is a representative example of the encryption algorithm E.

Upon receiving an encrypted text E2 from the terminal device 20 via the input/output unit 101, the authentication unit 106 compares the received encrypted text E2 with the encrypted text E1 stored therein. If the E1 and the E2 are the same, the authentication unit 106 returns a signal indicating "authentication OK" back to the command processing unit 105. If the E1 and the E2 are not the same, the authentication unit 106 returns a signal indicating "Authentication NG" to the command processing unit 105.

(c) Public Key Encryption Unit 107

When the memory card 10 performs service subscription processing with the content server 1 (30), the settlement server 1 (40), the content server 2 (50) and the settlement server 2 (60), the public key encryption unit 107 establishes a SAC with each server. Also, when the memory card 10 performs content transmission and reception with the content server 1 (30) and the content server 2 (50), the public key encryption unit 107 establishes SACs with the content server 1 (30) and the content server 2 (50). Also, when the memory card 10 performs settlement processing with the settlement server 1 (40) and the settlement server 2 (60), the public key encryption unit 107 establishes SACs with the settlement server 1 (40) and the settlement server 2 (60).

A representative example of the public key cryptosystem used by the public key encryption unit 107 is the elliptic curve cryptosystem and the RSA cryptosystem.

<Elliptic Curve Discrete Logarithm Problem>

The following briefly explains the elliptic curve discrete logarithm problem, which is used as a basis for security of the elliptic curve cryptosystem used by the public key encryption unit 107.

Assume that E(GF(p)) is an elliptic curve defined over a finite field GF(p), with a base point G on the elliptic curve E being set as a base point when the order of the elliptic curve E is exactly divided by a large prime. In this case, the discrete logarithm problem is to compute an integer x, if any, that satisfies the equation;

$Y=x*G$, where Y is a given element on the elliptic curve E.

Here, p is a prime and GF(p) is a finite field that includes p elements. In this Description, the symbol "*" represents repeated additions of an element included in the elliptic curve, and "x*G" means to add the base point G included in the elliptic curve x times, in the manner shown by the next equation;

$x*G=G+G+G+\ldots+G$.

The security of the public key cryptosystem is based on the discrete logarithm problem, because the discrete logarithm problem for the finite field GF(p) including a large number of elements is extremely difficult.

The details of the discrete logarithm problem are disclosed in: Neal Koblitz, "A Course in Number Theory and Cryptography", Springer-Verlag, 1987.

<Explanation of Calculation Formula Using Elliptic Curve>

The calculation using the elliptic curve is described next.

The elliptic curve is defined by $y^2=x^3+ax+b$, where the coordinates of arbitrary points P and Q are respectively $(x_1, y_1)$ and $(x_2, y_2)$. Here, the coordinates of a point R that is defined by "R=P+Q" are $(x_3, y_3)$.

If P≠Q, "R=P+Q" becomes an add operation. The following are the formulas for the add operation.

$x_3=\{(y_2-y_1)/(x_2-x_1)\}^2-x_1-x_2$, $y_3=\{(y_2-y_1)/(x_2-x_1)\}(x_1-x_3)-y_1$.

If P=Q, R=P+Q=P+P=2×P. Therefore, "R=P+Q" becomes a double operation. The following are the formulas for the double operation;

$x_3=\{(3x_1^2+a)/2y_1\}^2-2x_1$, $y_3=\{(3x_1^2+a)/2y_1\}(x_1-x_3)-y_1$.

Note that the operations described above are operations on the finite field over which the elliptic curve is defined. The details of the calculation formula using the elliptic curve is described in "Efficient Elliptic Curve Exponentiation" in Miyaji, Ono and Cohen, Advances in Cryptology-Proceedings of ICICS '97, Lecture Notes in Computer Science, pp. 282-290, Springer-Verlag, 1997).

<Service Subscription Processing>

The following describes operations performed by the public key encryption unit 107 for subscription of services provided by the servers. The public key encryption unit 107 performs, for each application program downloaded to the memory card 10, service subscription processing with a corresponding server. Here, the service subscription processing is operations for transmitting a public key to each server and obtaining a public key certification corresponding to the public key.

It is assumed here that an application program A, an application program B, an application program C and an application program D have been downloaded to the memory card 10.

The application program A is a program for obtaining an encrypted content ECNT_1 from the content server 1 (30) and decrypting the obtained encrypted content ECNT_1. The application program B is a program for performing settlement processing with the settlement server 1 (40). The application program C is a program for obtaining an encrypted content ECNT_2 from the content server 2 (50) and decrypting the obtained encrypted content ECNT_2. The application program D is a program for performing settlement processing with the settlement server 2 (60).

The public key encryption unit 107 generates SK_A as a private key specifically for the application program A, SK_B as a private key specifically for the application program B, SK_C as a private key specifically for the application program C and SK_D as a private key specifically for the application program D. More specifically, each private key is generated by a random number generator.

The public key encryption unit 107 generates public keys PK_A, PK_B, PK_C, and PK_D in the following manner, based on each of the generated private keys and using the elliptic curve cryptosystem as a public key cryptosystem. Here, it is assumed that an equation of the elliptic curve E: $y^2=X^3+ax+b \pmod p$ has been previously given to the public key encryption unit 107.

$$PK\_A=SK\_A*G (\bmod\, p);$$

$$PK\_B=SK\_B*G (\bmod\, p);$$

$$PK\_C=SK\_C*G (\bmod\, p); \text{ and}$$

$$PK\_D=SK\_D*G (\bmod\, p).$$

The public key encryption unit 107 outputs the generated private keys SK_A, SK_B, SK_C and SK_D to the access control unit 109, with a signal indicating that the private keys are to be stored in the secure area of the storing unit 104.

The public key encryption unit 107 establishes a SAC with the content server 1 (30), using the RSA cryptosystem as an algorithm for the public key encryption, and transmits the public key PK_A to the content server 1 (30) via the SAC. In the same manner, the public key encryption unit 107 establishes a SAC with the settlement server 1 (40) and transmits the public key PK_B to the settlement server 1 (40) via the SAC. Also, the public key encryption unit 107 establishes a SAC with the content server 2 (50), and transmits the public key PK_C to the content server 2 (50) via the SAC. Also, the public key encryption unit 107 establishes a SAC with the settlement server 2 (60), and transmits the public key PK_D to the settlement server 2 (60) via the SAC. The public key encryption unit 107 receives a public key certification Cert_A and a public key $K_{p\_}A$ from the content server 1 (30) via the SAC. The Cert_A is a certification for the public key PK_A issued by the content server 1 (30), and $K_{p\_}A$ is a public key of the content server 1 (30). In the same manner, the public key encryption unit 107 receives a public key certification Cert_B and a public key $K_{p\_}B$ from the settlement server 1 (40) via the SAC. The Cert_B is a certification for the public key PK_B issued by the settlement server 1 (40), and $K_{p\_}B$ is a public key of the settlement server 1 (40). In the same manner, the public key encryption unit 107 receives a public key certification Cert_C and a public key $K_{p\_}C$ from the content server 2 (50) via the SAC. The Cert_C is a certification for the public key PK_C issued by the content server 2 (50), and $K_{p\_}C$ is a public key of the content server 2 (50). In the same manner, the public key encryption unit 107 receives a public key certification Cert_D and a public key $K_{p\_}D$ from the settlement server 2 (60) via the SAC. The Cert_D is a certification for the public key PK_D issued by the settlement server 2 (60), and $K_{p\_}D$ is a public key of the settlement server 2 (60).

Upon receiving the public key certifications Cert_A, Cert_B, Cert_C and Cert_D, from the servers, the public key encryption unit 107 outputs the public key certifications Cert_A, Cert_B, Cert_C and Cert_D to the access control unit 109 with an instruction for adding signature data to the public key certifications. The public key encryption unit 107 outputs the public keys $K_{p\_}A$, $K_{p\_}B$, $K_{p\_}C$ and $K_{p\_}D$ received from the servers to the access control unit 109 with an instruction for storing the public keys in the user area 116 of the storing unit 104. The data structure of each of the public key certifications Cert_A, Cert_B, Cert_C and Cert_D is described later.

Note that the public key encryption unit 107 uses an initial private key SK_0010 described later and an initial certification Cert_0010 (120) shown in FIG. 3 for establishing a SAC for the service subscription processing.

The initial certification Cert_0010 (120) is a public key certification that the memory card 10 receives from the certificate authority 70. As FIG. 3 shows, the initial certification Cert_0010 (120) contains a device ID "ID_0010" (121) as an identifier for uniquely identifying the memory card 10, the above-described public key "PK_0010" (122), and signature data "SIG_0010CA" generated by the certificate authority 70 for the device ID 121 and the public key 122.

The initial certification Cert_0010 (120) has been transferred from the certificate authority 70 by mail or a safe communication channel, and is stored in the secure area 115 of the storing unit 104.

<Service Usage Request>

The following describes operations performed by the public key encryption unit 107 when the memory card 10 makes a service usage request to the content server 1 (30), the settlement server 1 (40), the content server 2 (50) and the settlement server 2 (60).

The public key encryption unit 107 reads, via the access control unit 109, a Cert_A' and the $K_{p\_}A$ from the user area 116 of the storing unit 104, and the private key SK_A from the secure area 115. The public key encryption unit 107 establishes a SAC with the content server 1 (30), using the elliptic curve cryptosystem as an algorithm for the public key encryption. More specifically, the public key encryption unit 107 reads and executes the application program A stored in the user area 116 to establish a SAC.

In the same manner, the public key encryption unit 107 reads, via the access control unit 109, a Cert_B' and the $K_{p\_}B$ from the user area 116 of the storing unit 104, and the private key SK_B from the secure area 115. The public key encryption unit 107 establishes a SAC with the settlement server 1 (40), using the elliptic curve cryptosystem as an algorithm for the public key encryption. More specifically, the public key encryption unit 107 reads and executes the application program B stored in the user area 116 to establish a SAC.

In the same manner, the public key encryption unit 107 reads, via the access control unit 109, a Cert_C' and the $K_{p\_}C$ from the user area 116 of the storing unit 104, and the private key SK_C from the secure area 115. The public key encryption unit 107 establishes a SAC with the content server 2 (50), using the elliptic curve cryptosystem as an algorithm for the public key encryption. More specifically, the public key encryption unit 107 reads and executes the application program C stored in the user area 116 to establish a SAC.

In the same manner, the public key encryption unit 107 reads, via the access control unit 109, a Cert_D' and the $K_{p\_}D$ from the user area 116 of the storing unit 104, and the private key SK_D from the secure area 115. The public key encryption unit 107 establishes a SAC with the settlement server 2 (60), using the elliptic curve cryptosystem as an algorithm for the public key encryption. More specifically, the public key encryption unit 107 reads and executes the application program D stored in the user area 116 to establish a SAC.

The public key encryption unit 107 outputs a session key that is shared with each server based on the SAC establishment, to the decryption unit 108 via the command processing unit 105. The operations for establishing a SAC is described later.

(d) Decryption Unit 108

The decryption unit 108 receives a session key from the public key encryption unit 107 via the command processing unit 105, and decrypts the encrypted data received from the access control unit 109, using the received session key. Note that the session key is key data to be shored with each server based on the SAC.

More specifically, the decryption unit 108 receives an encrypted content key $EK_{CNT\_}1$, that has been received from the content server 1 (30), from the access control unit 109, and decrypts the encrypted content key $EK_{CNT\_}1$ using the session key shared with the content server 1 (30), to generate a content key $K_{CNT\_}1$. The decryption unit 108 outputs the generated content key $K_{CNT\_}1$ to the access control unit 109 with an instruction for storing the content key $K_{CNT\_}1$ in the secure area 115 of the storing unit 104.

In the same manner, the decryption unit 108 receives an encrypted content key $EK_{CNT\_}2$, which has been received from the content server 2 (50), from the access control unit 109, and decrypts the encrypted content key $EK_{CNT\_}2$ using the session key shared with the content server 2 (50), to generate a content key $K_{CNT\_}2$. The decryption unit 108 outputs the generated content key $K_{CNT\_}2$ to the access control unit 109 with an instruction for storing the content key $K_{CNT\_}2$ in the secure area 115 of the storing unit 104.

Also, the decryption unit 108 decrypts encrypted payment amount notifying information and an encrypted electronic receipt REC_1, which have been received from the settlement server 1 (40), using the session key shared with the settlement server 1 (40), to generate payment amount notifying information and an electronic receipt EREC_1. The decryption unit 108 outputs the generated payment amount notifying information to the access control unit 109 with an instruction for outputting it to the TRM 103, and outputs the electronic receipt REC_1 to the access control unit 109 with a signal indicating that the electronic receipt REC_1 is to be stored in the secure area 115 of the storing unit 104.

In the same manner, the decryption unit 108 decrypts encrypted payment amount notifying information and an encrypted electronic receipt EREC_2, which have been received from the settlement server 2 (60), using the session key shared with the settlement server 2 (60), to generate payment amount notifying information and an electronic receipt REC_2. The decryption unit 108 outputs the generated payment amount notifying information to the access control unit 109 with an instruction for outputting it to the TRM 103, and outputs the electronic receipt REC_2 to the access control unit 109 with a signal indicating that the electronic receipt REC_2 is to be stored in the secure area 115 of the storing unit 104.

Note that the above-described decryption processing is realized by the decryption unit 108 reading and executing each of the application programs A, B, C and D stored in the user area 116.

Moreover, upon receiving an instruction for decrypting an encrypted content from the command processing unit 105, the decryption unit 108 reads the encrypted content ECNT_1 or ECNT_2 whichever specified, from the user area 116 via the access control unit 109. Also, the decryption unit 108 reads the content key $K_{CNT\_}1$ or $K_{CNT\_}2$ whichever corresponding to the encrypted content from the secure area 115 via the access control unit 109.

Using the content key $K_{CNT\_}1$ as a decryption key, the decryption unit 108 applies a decryption algorithm $D_1$ to the encrypted content ECNT_1 to generate a content CNT_1. Here, the decryption algorithm $D_1$ is an algorithm for converting the encrypted text encrypted by the encryption algorithm $E_1$ to a plain text. The decryption unit 108 outputs the content CNT_1 to the terminal device 20 via the command processing unit 105 and the input/output unit 101.

In the same manner, using the content key $K_{CNT\_}2$, the decryption unit 108 decrypts the encrypted content ECNT_2 to generate a content CNT_2. The decryption unit 108 outputs the content CNT_2 to the terminal device 20 via the command processing unit 105 and input/output unit 101.

(c) Access Control Unit 109

Upon instructed by the command processing unit 105 to start up an application program, the access control unit 109 reads a specified application program from the user area 116.

Also, the access control unit 109 controls input of data into the TRM 103 and the secure area 115 and the user area 116 of the storing unit 104, and output of data from the secure area 115 and the user area 116 of the storing unit 104.

More specifically, the access control unit 109 performs data reading from the user area 116 and data writing into the user area 116 without any limitation. Regarding the data reading from the secure area 115 and the data writing into the secure area 115, the access control unit 109 makes an inquiry to the command processing unit 105 for the result of the device authentication. Only if the result of the device authentication is "authentication OK", the access control unit 109 performs reading and writing.

Upon instructed to generate a public key based on the initial private key SK_0010 store in the internal memory 114 of the TRM 103, the access control unit 109 informs the TRM control unit 112 via the TRM input/output unit 111 of the TRM 103 about that. Moreover, upon receiving an instruction for generating signature data and Cert_A, Cert_B, Cert_C and Cert_D from the public key encryption unit 107, the access control unit 109 outputs an instruction for generating the signature data and Cert_A, Cert_B, Cert_C and Cert_D to the TRM control unit 112 via the TRM input/output unit 111 of the TRM 103.

Also, upon receiving Cert_A', Cert_B', Cert_C' and Cert_D' from the TRM input/output unit 111, the access control unit 109 stores them in the user area 116 of the storing unit 116 in correspondence with the application program A, the application program B, the application program C and the application program D respectively.

Also, upon receiving a payment amount notifying information, the access control unit 109 outputs a payment instruction for paying electronic money and the payment amount notifying information to the TRM control unit 112 via the TRM input/output unit 111.

(3) TRM 103

The TRM is tamper-resistant and inaccessible for the CPU of the terminal device 20.

(a) The TRM input/output unit 111 outputs an instruction received from the access control unit 109 to the TRM control unit 112, and outputs data received from the TRM control unit 112 to the access control unit 109.

(b) The TRM control unit 112 receives an instruction from the TRM input/output unit 111, and performs the following operations in accordance with the received instruction.

Upon receiving an instruction to generate a public key based on the initial private key SK_0010 from the TRM input/output unit 111, the TRM control unit 112 reads the initial private key SK_0010 from the internal memory 114 via the internal memory input/output unit 113. In this embodiment, a unique number, which has been written in the internal memory 114 when the memory card 10 is manufactured, is used as the initial private key SK_0010. However, the initial private key SK_0010 is not limited to the unique number determined at the manufacturing. For example, unique information given by the certificate authority 70 to the memory card 10 may be used. The TRM control unit 112 generates the public key PK_0010 based on the initial private key SK_0010 read from the internal memory 114.

The generated public key PK_0010 is to be output to the access control unit 109 via the TRM input/output unit 111. Note that the public key PK_0010 is to be notified to the certificate authority 70 to receive the initial certification Cert_0010 (See FIG. 3) from the certificate authority 70.

Upon receiving the Cert_A and the instruction for generating signature data from the TRM input/output unit 111, the TRM control unit 112 reads the initial private key SK_0010 from the internal memory 114 via the internal memory input/output unit 113. The TRM control unit 112 generates signature data based on the Cert_A using the SK_0010, and adds the generated signature data to the Cert_A to generate Cert_A'. The TRM control unit 112 outputs the generated Cert_A' to the access control unit 109 via the TRM input/output unit 111. In the same manner, the TRM control unit 112 generates Cert_B' based on the Cert_B, using the SK_0010 read from the internal memory 114, and outputs the generated Cert_B' to the access control unit 109. In the same manner, the TRM control unit 112 generates Cert_C' based on the Cert_C and outputs the generated Cert_C' to the access control unit 109. In the same manner, the TRM control unit 112 generates Cert_D' based on the Cert_D and outputs the generated Cert_D' to the access control unit 109.

The data structure of each of the Cert_A', Cert_B', Cert_C' and Cert_D' is described later.

Also, upon receiving an instruction for paying electronic money and the payment amount notifying information from the TRM input/output unit 111, the TRM control unit 112 subtracts, via the internal memory input/output unit 113, the amount indicated by the payment amount notifying information from the amount indicated by electronic money information stored in the internal memory 114. After the subtraction, the TRM control unit 112 outputs a signal indicating that the subtraction has been finished to the access control unit 109 via the TRM input/output unit 111. More specifically, these operations are realized by the TRM control unit 112 starting up the application program B or D within the TRM control unit 112, and executing the application program B or D.

(c) The internal memory input/output unit 113 bridges information between the TRM control unit 112 and the internal memory 114.

(d) The internal memory 114 is, specifically, structured from an EEPROM. The internal memory 114 prestores the initial private key SK_0010. The initial private key SK_0010 is, specifically, a number unique to the memory card 10, as described above.

The internal memory 114 further stores electronic money information. The electronic money information possesses cash value, and can be used for payment for purchases of goods and services. The electronic money information has been prestored in safety in the internal memory 114 via cash charger or the like.

(4) Storing Unit 104

The storing unit 104 includes the secure area 115 whose security level is lower than the internal memory 114 of the TRM 103, and the user area 116. The storing unit 104 is, specifically, structured from a flash memory.

(a) The secure area 115 stores the private keys SK_A, SK_B, SK_C and SK_D generated by the public key encryption unit 107. The private key SK_A is stored in association with the application program A and the public key certification Cert_A. The private key SK_B is stored in association with the application program B and the public key certification Cert_B. Here, the private key SK_C is stored in association with the application program C and the public key certification Cert_C. The private key SK_D is stored in association with the application program D and the public key certification Cert_D.

The secure area 115 also stores the content keys $K_{CNT}\_1$ and $K_{CNT}\_2$. The content key $K_{CNT}\_1$ is a decryption key for decrypting the encrypted content ECNT_1 obtained from the content server 1 (30). The content key $K_{CNT}\_2$ is a decryption key for decrypting the encrypted content ECNT_2 obtained from the content server 2 (50). Here, the content key $K_{CNT}\_1$ is stored in association with the encrypted content ECNT_1, and the content key $K_{CNT}\_2$ is stored in association with the encrypted content ECNT_2.

The secure area 115 also stores the electronic receipt REC_1 obtained form the settlement server 1 (40), and the electronic receipt REC_2 obtained from the settlement server 2 (60).

(b) The user area 116 stores a CRL (Certification Revocation List). The CRL is a list of IDs of devices that have been invalidated, such as the IDs of devices that have performed unauthorized operations and the IDs of devices whose private keys are exposed. The CRL is generated by the certificate authority 70. The memory card 10 constantly receives the latest CRL from the certificate authority 70 via the network 80 and the terminal device 20, and stores the received latest CRL instead of the old CRL that has been stored in the user area 116. The CRL is used by the public key encryption unit 107 when the memory card 10 establishes a SAC with each server.

FIG. 4 shows a data structure of a CRL 125 as a specific example of the above-described CRL. As FIG. 4 shows, the CRL contains, as invalidated device IDs, ID_0012, ID_0058, ID_0379, and so on.

The details of the CRL are disclosed in: American National Standards Institute, American National Standard for Financial Services, ANSX9.57: Public Key Cryptography for the Financial Industry: Certificate Management, 1997.

The user area 116 also stores the initial certification Cert_0010 (120). As described above, the initial certification Cert_0010 (120) is a public key certification that the memory card 10 has obtained from the certificate authority 70.

The user area 116 also stores the public key certification Cert_A'. The public key certification Cert_A' is a public key certification generated by the TRM control unit 112 adding signature data to the public key certification Cert_A obtained from the content server 1 (30).

FIG. 5A shows a data structure of the Cert_A (130). As FIG. 5A shows, the Cert_A (130) includes a service ID "SID_0123A" (131), a membership number "NO_0010" (132), a public key "PK_A" (133) and signature data 1 "Sig_0010A" (134).

The service ID "SID_0123A" (131) indicates a type of a service registered by the memory card 10 to use the service, among the services provided by the content server 1 (30). The service ID "SID_0123A" indicates, for example, a movie distribution service that is available with use of the application program A. The membership number "NO_0010" (132) is a number assigned to the memory card 10 for distinguishing the memory card 10 from the plurality of devices registered with the content server 1 (30). The public key "PK_A" (133) is key data generated by the memory card 10 from the private key SK_A that is specifically for use by the application program A. The signature data 1 "Sig_0010A" (134) is data generated by the content server 1 (30) applying a signature algorithm to "SID_0123A" (131), "NO_0010" (132), and "PK_A" (133).

FIG. 5B shows a data structure of Cert_A' (135) stored in the secure area 115. As FIG. 5B shows, the Cert_A' (135) includes the service ID "SID_0123A" (131), the membership number "NO_0010" (132), the public key "PK_A" (133), the signature data 1 "Sig_0010A" (134) and signature data 2 "Sig_ASDeX" (136). The public key certification Cert_A' has a structure in which the signature data 2 "Sig_ASDeX" (136) is added to the Cert_A.

The signature data 2 "Sig_ASDeX" (136) is data generated by the TRM control unit 112 applying a signature algorithm to "SID_0123A" (131), "NO_0010" (132), "PK_A" (133) and "Sig_0010A" (134).

The user area 116 also stores the public key certification Cert_B'. The public key certification Cert_B' is a public key certification generated by the TRM control unit 112 adding signature data to the public key certification Cert_B obtained from the settlement server 1 (40).

Figure 6A:
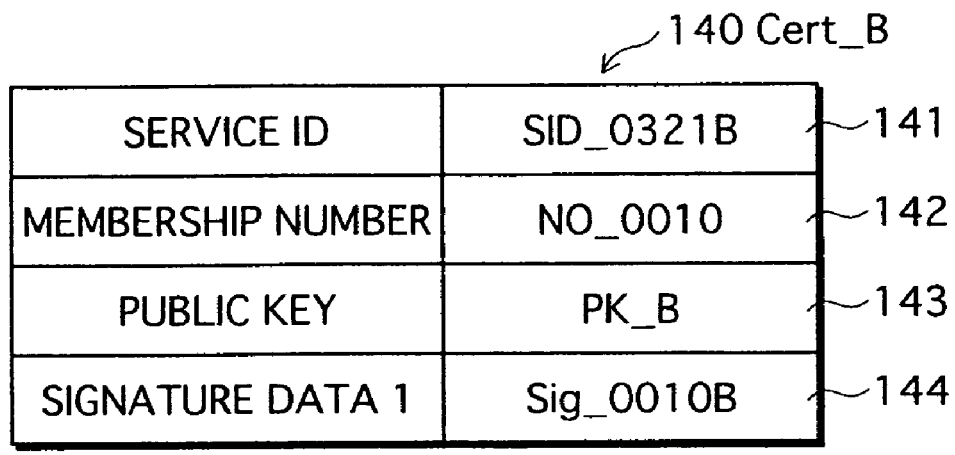
FIG. 6A shows a data structure of a Cert_B (140) that a memory card 10 receives from a settlement server 1 (40)

FIG. 6A shows a data structure of the Cert_B (140). As FIG. 6A shows, the Cert_B (140) includes a service ID "SID_0321B" (141), a membership number "NO_0010" (142), a public key "PK_B" (143) and signature data 1 "Sig_0010B" (144).

The service ID "SID_0321B" (141) indicates a type of a service registered by the memory card 10 to use the service, among the services provided by the settlement server 1 (40). The service ID "SID_0321B" indicates, for example, an electronic money settlement service that is available with use of the application program B. The membership number "NO_0010" (142) is a number assigned to the memory card 10 for distinguishing the memory card 10 from the plurality of devices registered with the settlement server 1 (40). The public key "PK_B" (143) is key data generated by the memory card 10 from the private key SK_B that is specifically for use by the application program B. The signature data 1 "Sig_0010B" (144) is data generated by the settlement server 1 (40) applying a signature algorithm to "SID_0123B" (141), "NO_0010" (142), and "PK_B" (143).

Figure 6B:
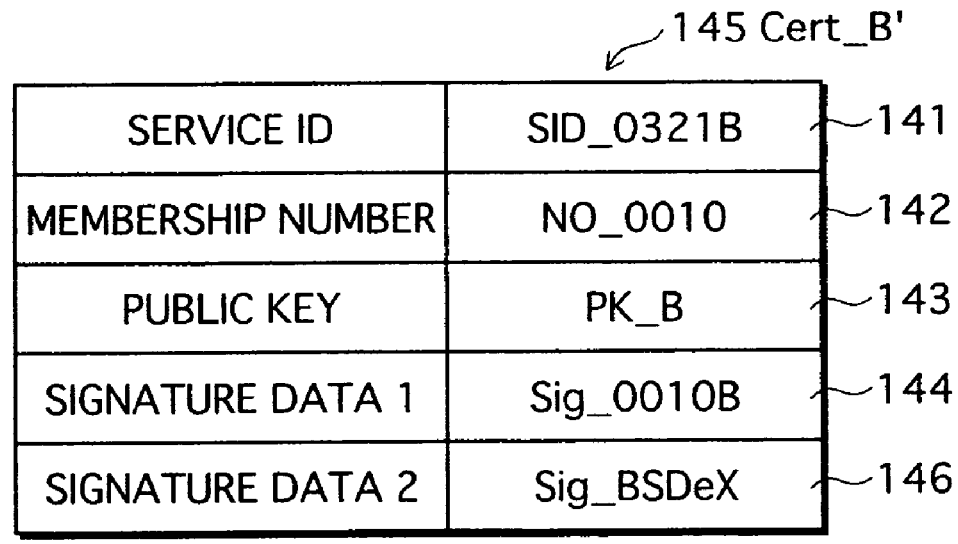
FIG. 6B shows a data structure of Cert_B' (145) that is stored in a user area 116 of a memory card 10.

FIG. 6B shows a data structure of Cert_B' (145) stored in the secure area 115. As FIG. 6B shows, the Cert_B' (145) includes the service ID "SID_0321B" (141), the membership number "NO_0010" (142), the public key "PK_B" (143), the signature data 1 "Sig_0010B" (144) and signature data 2 "Sig_BSDeX" (146). The public key certification Cert_B' has a structure in which the signature data 2 "Sig_BSDeX" (146) is added to the Cert_B.

The signature data 2 "Sig_BSDeX" (146) is data generated by the TRM control unit 112 applying a signature algorithm to "SID_0321B" (141), "NO_0010" (142), "PK_B" (143) and "Sig_0010B" (144).

The user area 116 also stores the public key certification Cert_C'. The public key certification Cert_C' is a public key certification generated by the TRM control unit 112 adding signature data to the public key certification Cert_C obtained from the content server 2 (50).

FIG. 7A shows a data structure of the Cert_C (150). As FIG. 7A shows, the Cert_C (150) includes a service ID "SID_0123C" (151), a membership number "NO_0025" (152), a public key "PK_C" (153) and signature data 1 "Sig_0010C" (154).

The service ID "SID_0123C" (151) indicates a type of a service registered by the memory card 10 to use the service, among the services provided by the content server 2 (50). The service ID "SID_0123C" indicates, for example, a music distribution service that is available with use of the application program C. The membership number "NO_0025" (152) is a number assigned to the memory card 10 for distinguishing the memory card 10 from the plurality of devices registered with the content server 2 (50). The public key "PK_C" (153) is key data generated by the memory card 10 from the private key SK_C that is specifically for use by the application program C. The signature data 1 "Sig_0010C" (154) is data generated by the content server 2 (50) applying a signature algorithm to "SID_0123C" (151), "NO_0025" (152), and "PK_C" (153).

FIG. 7B shows a data structure of Cert_C' (155) stored in the secure area 115. As FIG. 7B shows, the Cert_C' (155) includes the service ID "SID_0123C" (151), the membership number "NO_0025" (152), the public key "PK_C" (153), the signature data 1 "Sig_0010C" (154) and signature data 2 "Sig_CSDeX" (156). The public key certification Cert_C' has a structure in which the signature data 2 "Sig_CSDeX" (156) is added to the Cert_C.

The signature data 2 "Sig_CSDeX" (156) is data generated by the TRM control unit 112 applying a signature algorithm to "SID_0123C" (151), "NO_0025" (152), "PK_C" (153) and "Sig_0010C" (154).

The user area 116 also stores the public key certification Cert_D'. The public key certification Cert_D' is a public key certification generated by the TRM control unit 112 adding signature data to the public key certification Cert_D obtained from the settlement server 2 (60).

FIG. 8A shows a data structure of the Cert_D (160). As FIG. 8A shows, the Cert_D (160) includes a service ID "SID_0321D" (161), a membership number "NO_0025" (162), a public key "PK_D" (163) and signature data 1 "Sig_0010D" (164).

The service ID "SID_0321D" (161) indicates a type of a service registered by the memory card 10 to use the service, among the services provided by the settlement server 2 (60). The service ID "SID_0321D" indicates, for example, an electronic money settlement service that is available with use of the application program D. The membership number "NO_0025" (162) is a number assigned to the memory card 10 for distinguishing the memory card 10 from the plurality of devices registered with the settlement server 2 (60). The public key "PK_D" (163) is key data generated by the memory card 10 from the private key SK_D that is specifically for use by the application program D. The signature data 1 "Sig_0010D" (164) is data generated by the settlement server 2 (60) applying a signature algorithm to "SID_0321D" (161), "NO_0025" (162), and "PK_D" (163).

FIG. 8B shows a data structure of Cert_D' (165) stored in the secure area 115. As FIG. 8B shows, the Cert_D' (165) includes the service ID "SID_0321D" (161), the membership number "NO_0025" (162), the public key "PK_D" (163), the signature data 1 "Sig_0010D" (164) and signature data 2 "Sig_DSDeX" (166). The public key certification Cert_D' has a structure in which the signature data 2 "Sig_DSDeX" (166) is added to the Cert_D.

The signature data 2 "Sig_DSDeX" (166) is data generated by the TRM control unit 112 applying a signature algorithm to "SID_0321D" (161), "NO_0025" (162), "PK_D" (163) and "Sig_0010D" (164).

The user area 116 also stores the public key $K_p\_A$ of the content server 1 (30), the public key $K_p\_B$ of the content server 1 (40), the public key $K_p\_C$ of the settlement server 2 (50) and the public key $K_p\_D$ of the settlement server 2 (60).

The user area 116 also stores the encrypted content ECNT_1 obtained from the content server 1 (30) and the encrypted content ECNT_2 obtained from the content server 2 (50).

The user area 116 also stores the application program A, the application program B, the application program C and the application program D.

Figure 9:
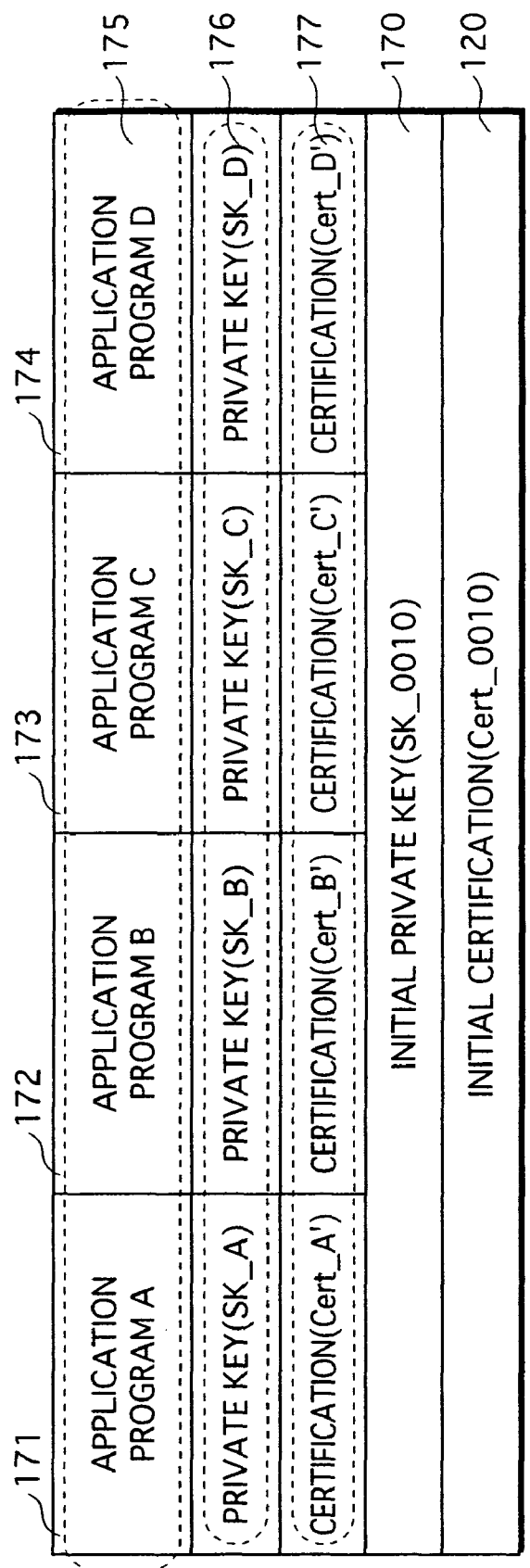
FIG. 9 explains a relationship among private keys, public key certifications, an initial private key, an initial certification, and application programs.

FIG. 9 shows a relation among the private key, the public key certification and the application program stored in the memory card 10.

FIG. 9 shows that the application program illustrated in the top row of the table performs the service subscription processing and the service usage processing using all the private keys and the public key certifications illustrated in the lower rows.

In other words, the application program A (171) uses the private key SK_A, the public key certification Cert_A', the initial private key SK_0010 (170) and the initial certification Cert_0010 (120). The application program B (172) uses the private key SK_B, the public key certification Cert_B', the initial private key SK_0010 (170) and the initial certification Cert_0010 (120). The application program C (173) uses the private key SK_C, the public key certification Cert_C', the initial private key SK_0010 (170) and the initial certification Cert_0010 (120). The application program D (174) uses the private key SK_D, the public key certification Cert_D', the initial private key SK_0010 (170) and the initial certification Cert_0010 (120).

In FIG. 9, the application programs surrounded by a dotted line 175 are stored in the user area 116 of the storing unit 104. The private keys surround by a dotted line 176 are stored in the secure area 115 of the storing unit 104. The public key certifications surrounded by a dotted line 177 are stored in the user area 116 of the storing unit 104. The initial private key 170 is stored in the internal memory 114 of the TRM 103. The initial certification 120 is stored in the user area 116 of the storing unit 104.

2. Terminal Device 20

The following describes a structure of the terminal device 20 in detail.

Figure 10:
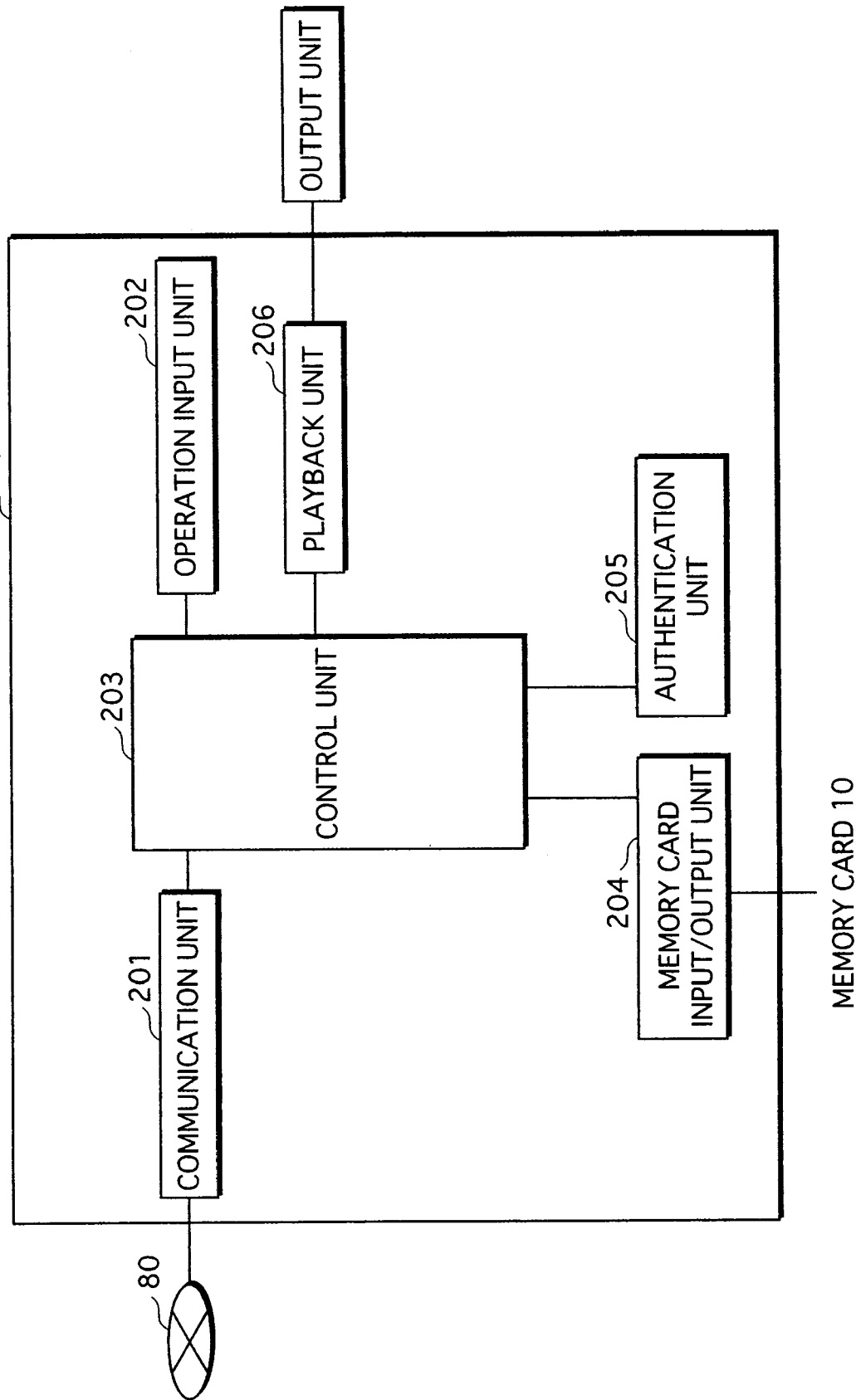
FIG. 10 is a functional block diagram showing a structure of a terminal device 20.

FIG. 10 is a functional block diagram functionally showing the structure of the terminal device 20. As FIG. 10 shows, the terminal device 20 includes a communication unit 201, an operation input unit 202, a control unit 203, a memory card input/output unit 204, an authentication unit 205 and a playback unit 206.

The terminal device 20 is, specifically, a computer system structured from a microprocessor, a ROM, a RAM, a hard disk drive unit, a network connection unit, a decoder, an encoder, a memory card slot, and so on.

(1) Communication Unit 201

The communication unit 201 is a network connection unit having a web browser, and connected with the content server 1 (30), the settlement server 1 (40), the content server 2 (50) and the settlement server 2 (60) via the network 80.

The communication unit 201 receives information from each server via the network 80, and outputs the received information to the control unit 203. The communication unit 201 also receives information from the control unit 203, and transmits the received information to each server via the network 80.

Here, the communication unit 201 transmits, for example, a service subscription request, a service usage request, signature data to be used for establishing a SAC with each server, key information and so on to each server.

The communication unit 201 receives, for example, signature data to be used for establishing a SAC with each server, key information, and an encrypted content, an encrypted content key and an encrypted electronic receipt to be transmitted from each server after the authentication and the key sharing processing has been finished, and so on from each server.

The communication unit 201 is also connected with the certificate authority 70 via the network 80. The communication unit 201 constantly receives the latest CRL, and outputs the received latest CRL to the memory card 10 via the control unit 203 and the memory card input/output unit 204.

(2) Operation Input Unit 202

The operation input unit 202 has buttons for receiving user's operations. The operation input unit 202 receives a user's operation, generates a command corresponding to the received operation, and outputs the generated command to the control unit 203. The command is, for example, a service subscription request, a service usage request, a content playback request, and so on.

(3) Control Unit 203

The control unit 203 is structured from a microprocessor, a ROM, a RAM and so on, and controls the whole of the terminal device 20 with the microprocessor operating in accordance with a computer program.

The control unit 203 outputs various types of information received from the communication unit 201 to the memory card 10 via the memory card input/output unit 204. Also, upon receiving a command instructing playback of a content from the operation input unit 202, the control unit 203 outputs the received command to the memory card 10 via the memory card input/output unit 204.

Also, upon receiving a content from the memory card 10 via the memory card input/output unit 204, the control unit 203 outputs the received content to the playback unit 206.

(4) Memory Card Input/Output Unit 204

The memory card input/output unit 204 is structured from a memory card slot and so on. In a state where the memory card 10 is inserted in the memory card slot, the memory card input/output unit 204 performs input and output of information between the control unit 203 and the memory card 10.

(5) Authentication Unit 205

The authentication unit 205 is structured from a microprocessor, a ROM, a RAM and so on. A authentication program is stored in the ROM or the RAM, and the microprocessor executes the authentication program. The ROM prestores an authentication password PW_0. The PW_0 is secret data shared with the memory card 10, and used for the challenge-response type authentication performed with the authentication unit 106 of the memory card 10.

The authentication unit 205 receives a random number R_0 from the memory card 10 via the memory card input/output unit 204. Using the received random number R_0 as an encryption key, the authentication unit 205 applies an encryption algorithm E to the authentication password PW_0 to generate an encrypted text E2. The authentication unit 205 outputs the generated encrypted text E2 to the memory card 10 via the control unit 203 and the memory card input/output unit 204.

Here, a DES (Data Encryption Standard) is a representative example of the encryption algorithm E.

(6) Playback Unit 206

The playback unit 206 is structured from a decoder, a buffer and so on. Upon receiving a content CNT_1 from the memory card 10 via the control unit 203 and the memory card input/output unit 204, the playback unit 206 decodes the received content CNT_1 to generate video signals and audio signals. The playback signal outputs the generated video signals and audio signals to an external output device connected with the playback unit 206.

Also, upon receiving a content CNT_2 from the memory card 10, the playback unit 206 decodes the received content CNT_2 to generate audio signals. The playback unit 206 outputs the generated audio signals to the output device. The output device is specifically a monitor and a speaker.

3. Content Server 1 (30)

The following describes a structure of the content server 1 (30).

Figure 11:
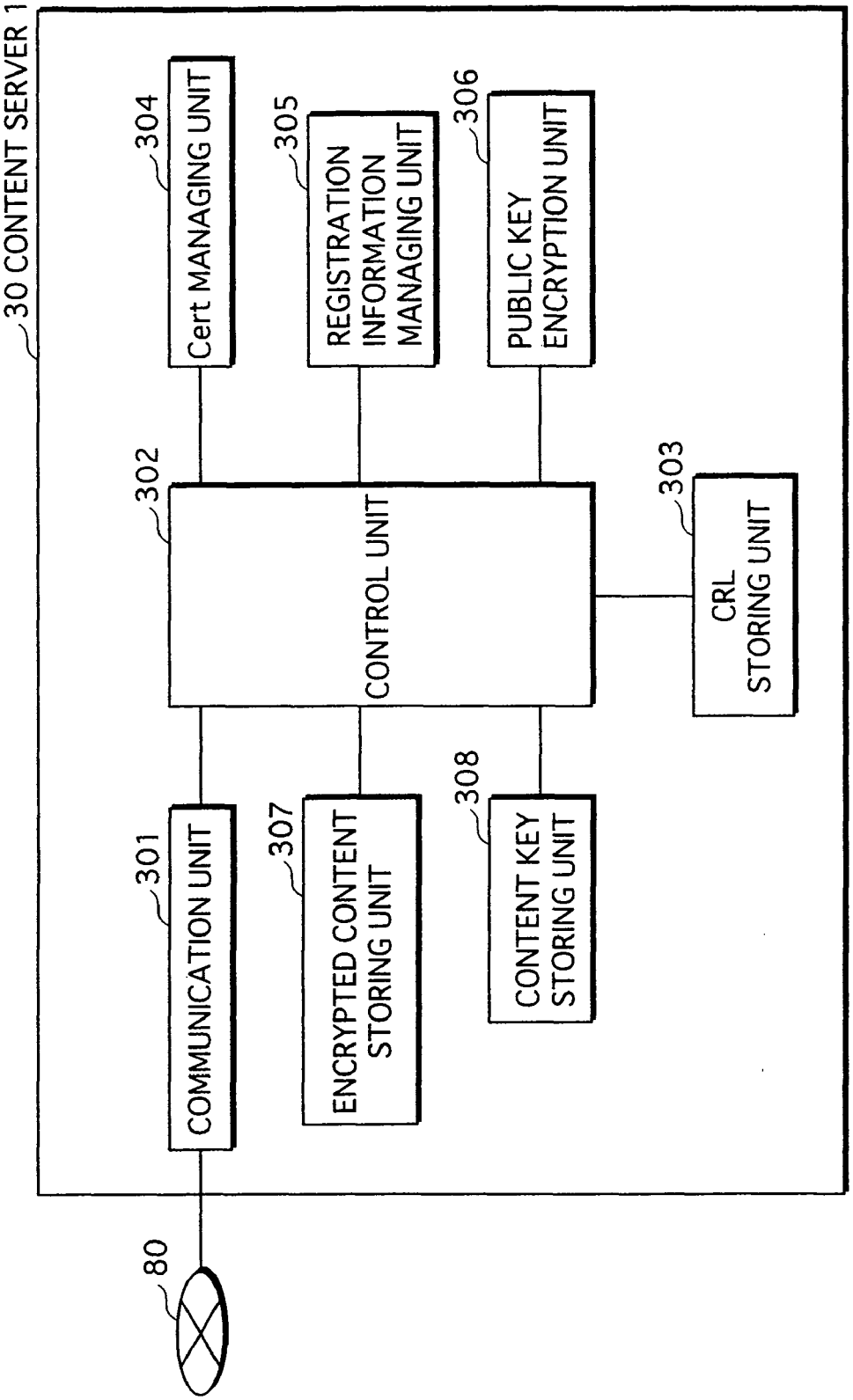
FIG. 11 is a functional block diagram showing a structure of a content server 1 (30)

FIG. 11 is a functional block diagram functionally showing the structure of the content server 1 (30). As FIG. 11 shows, the content server 1 (30) includes a communication unit 301, a control unit 302, a CRL storing unit 303, a Cert managing unit 304, a registration information storing unit 305, a public key encryption unit 306, a encrypted content storing unit 307 and a content key storing unit 308.

The content server 1 (30) is, specifically, a computer system structured from a microprocessor, a ROM, a RAM, a hard disk unit, a network connection unit and so on.

(1) Communication Unit 301

The communication unit 301 is a network connection unit, and communicates with other devices via the network 80.

The communication unit 301 receives the public key PK_A, the Cert_A', the signature data used for establishing a SAC, the key information and so on, and outputs the received information to the control unit 302. The communication unit 301 also receives the public key certification Cert_A, the signature data used for establishing a SAC, the key information, the encrypted content ECNT_1, the encrypted content key $EK_{CNT\_1}$ and so on, and transmits the received information to the memory card 10 via the terminal device 20.

Moreover, the communication unit 301 is connected with the certificate authority 70 via the network 80. The communication unit 301 constantly receives the latest CRL from the certificate authority 70 via the network 80, and stores the received latest CRL in the CRL storing unit 303 via the control unit 302.

The communication unit 301 also receives a public key PK_0030 from the public key encryption unit 306 via the control unit 302, and transmits the received public key PK_0030 to the certificate authority 70 via the network 80. The communication unit 301 also receives an initial certification Cert_0030, which is a public key certification corresponding to the public key PK_0030, and outputs the received initial certification Cert_0030 to the Cert managing unit 304 via the control unit 302. Here, it is assumed that the initial certification Cert_0030 is received from/transmitted to the certificate authority 70.

Note that the structure above for receiving and transmitting the initial certification Cert_0030 in safety via the network is only an example. The initial certification Cert_0030 may be notified by the certificate authority 70 to the content server 1 (30) by mail or the like.

The communication unit 301 also receives settlement request information from the control unit 302, and transmits the received settlement request information to the settlement server 1 (40) via the network 80. The details of the settlement request information are described later.

(2) Control Unit 302

The control unit 302 is structure from a microprocessor, a ROM, a RAM and so on, and controls the whole of the content server 1 (30) with the microprocessor executing a compute program.

(a) Upon receiving a service subscription request from the memory card 10, the control unit 302 reads the initial certification Cert_0030 stored in the Cert managing unit 304. Further, the control unit 302 instructs the public key encryption unit 306 to perform processing for establishing a SAC.

(b) The control unit 302 receives a service usage request with the Cert_A' from the memory card 10. As FIG. 5B shows, the Cert_A' includes the signature data 1 (134) and the signature data 2 (135). The control unit 302 authenticates the signature data 1 (134) and the signature data 2 (135). If the authentication of the signature data 1 (134) and the signature data 2 (135) has failed, the control unit 302 finishes the processing. If the authentication of the signature data 1 (134) and the signature data 2 (135) has succeeded, the control unit 302 instructs the public key encryption unit 306 to perform processing for establishing a SAC.

(c) After a SAC is established between the content server 1 (30) and the memory card 10, to transmit and receive information to and from the memory card 10, the control unit 302 receives a session key from the public key encryption unit 306. Using the received session key as an encryption key or a decryption key, the control unit 302 encrypts information and transmits the information to the memory card 10, or decrypts encrypted information received from the memory card 10.

For example, when providing a service, the control unit 302 receives the session key from the public key encryption unit 306, reads the encrypted content ECNT_1 from the encrypted content storing unit 307, and reads the content key $K_{CNT\_1}$ corresponding to the encrypted content ECNT_1 from the content key storing unit 307. The control unit 302 encrypts the read content key $K_{CNT\_1}$ using the session key to generate the encrypted content key $EK_{CNT\_1}$. The control unit 302 transmits the generated encrypted content key $EK_{CNT\_1}$, with the encrypted content ECNT_1, to the memory card 10 via the communication unit 301.

(d) The control unit 302 generates a piece of settlement request information for each transaction. Specifically, after transmitting the encrypted content ECNT_1 and the encrypted content key $EK_{CNT\_1}$ to the memory card 10, the control unit 302 generates the settlement request information 410 shown in FIG. 14. Note that the phrase "transaction" indicates that the control unit 302 transmits the encrypted content ECNT_1 and the encrypted content key $EK_{CNT\_1}$ to the memory card 10.

The settlement request information includes a service ID (SID_0123A), a membership number (NO_0010), a usage number (0322001), an amount of money (1200), and a date of use (2005/3/22).

The service ID (SID_0123A) indicates a type of the service registered with the memory card 10. The membership number (NO_0010) indicates the membership number of the memory card 10. The usage number (0322001) indicates that the relevant transaction is the first transaction performed with the memory card 10 on March 22. The amount of money (1200) indicates the amount of money paid in the transaction. The date of use (2005/3/22) indicates the date on which the relevant transaction was performed.

The control unit 302 transmits the generated settlement request information 410 to the settlement server 1 (40) via the communication unit 301 and the network 80.

(3) CRL Storing Unit 303

The CRL storing unit 303 is structured from a RAM, and stores therein the latest CRL. The CRL stored in the CRL storing unit 303 is the same as the CRL 125 shown in FIG. 4, which is a list of IDs of devices that have been invalidated, such as the IDs of devices that have performed unauthorized operations and the IDs of devices whose private keys are exposed.

Upon receiving the latest CRL from the control unit 302, the CRL storing unit 303 stores the received latest CRL instead of the old CRL that has been stored in the CRL storing unit 303.

(4) Cert Managing Unit 304

The cert managing unit 304 receives the initial certification Cert_0030 from the control unit 302, and stores therein the received initial certification. The initial certification Cert_0030 is a public key certification received from the certificate authority 70.

FIG. 13A shows a data structure of the initial certification Cert_0030 (310). As FIG. 13A shows, the initial certification Cert_0030 (310) contains a device ID "ID_0030" as an identifier for uniquely identifying the content server 1 (30), a public key "PK_0030" of the content server 1 (30), and signature data "SIG_0030CA" generated by the certificate authority 70 for the device ID (ID_0030) and the public key PK_0030.

(5) Registration Information Managing Unit 305

The registration information managing unit 305 manages registration information of a device to which the public key certification is issued by the public key encryption unit 306. The registration information includes information of: the public key of the registered device; the membership number assigned to the device; the network address of the device; and the user, and so on. The registration information is used for managing the registered device and the user of the device. The registration information is also used by the control unit 302 for authenticating the public key certification Cert_A' received from the memory card 10.

(6) Public Key Encryption Unit 306

<Request for Initial Certification Cert_0030>

Prior to the communication with the memory card 10, the public key encryption unit 306 requests the certificate authority 70 to issue a public key certification.

More specifically, the public key encryption unit 306 generates the public key PK_0030 from the initial private key SK_0030 prestored therein. The public key encryption unit 306 transmits its own device ID "ID_0030" and the generated public key PK_0030 to the certificate authority 70 via the control unit 302 and the communication unit 301.

<Registration of Memory Card 10>

In the service subscription processing and the registration processing, the public key encryption unit 306 establishes a SAC in accordance with the instruction by the control unit 302, and shares a session key with the memory card 10. The public key encryption unit 306 outputs session key shared with the memory card 10 to the control unit 302.

The public key encryption unit 306 generates a private key $K_S\_A$ and calculates $K_p\_A = K_s\_A*G(\mod p)$ to generate the public key $K_p\_A$. The public key encryption unit 306 transmits the generated public key $K_p\_A$ to the memory card 10 via the SAC. Here, assume that the equation of the elliptic curve $y^2 = x^3 + ax + b(\mod p)$ has already been given.

The public key encryption unit 306 receives the public key PK_A from the memory card 10 via the SAC, and generates the public key certification Cert_A (130) based on the received public key PK_A. The data structure of the Cert_A (130) is shown in FIG. 5A. The public key encryption unit 306 transmits the generated Cert_A (130) to the memory card 10 via the SAC.

<Providing Service to Memory Card 10>

In processing for providing a service to the memory card 10, the public key encryption unit 306 establishes a SAC in accordance with an instruction from the control unit 302, and shares a session key with the memory card 10. The public key encryption unit 306 outputs the session key shared with the memory card 10 to the control unit 302. The details of the processing for establishing a SAC is described later.

(7) Encrypted Content Storing Unit 307

The Encrypted content storing unit 307 is structured from a hard disk unit, and stores therein the encrypted content ECNT_1.

The encrypted content ECNT_1 is data generated by applying the encryption algorithm $E_1$ to the content CNT_1 using the content key $K_{CNT}\_1$ as the encryption key. Here, the content CNT_1 is digital data generated by compression-coding video signals and audio signals in conformity with a predetermined standard or rule, such as MPEG. Here, the DES is a representative example of the encryption algorithm $E_1$.

(8) Content Key Storing Unit 308

The content key storing unit 308 is structure from a ROM or a RAM, and stores therein the content key $K_{CNT}\_1$.

Note that the encrypted content storing unit 307 and the content key storing unit 308 may store a plurality of encrypted contents and a plurality of content keys respectively. If this is the case, the encrypted contents and the content keys are associated with each other on a one-to-one basis, and respectively stored in the content storing unit 307 and the content key storing unit 308.

4. Settlement Server 1 (40)

The following describes the structure of the settlement server 1 (40).

Figure 12:
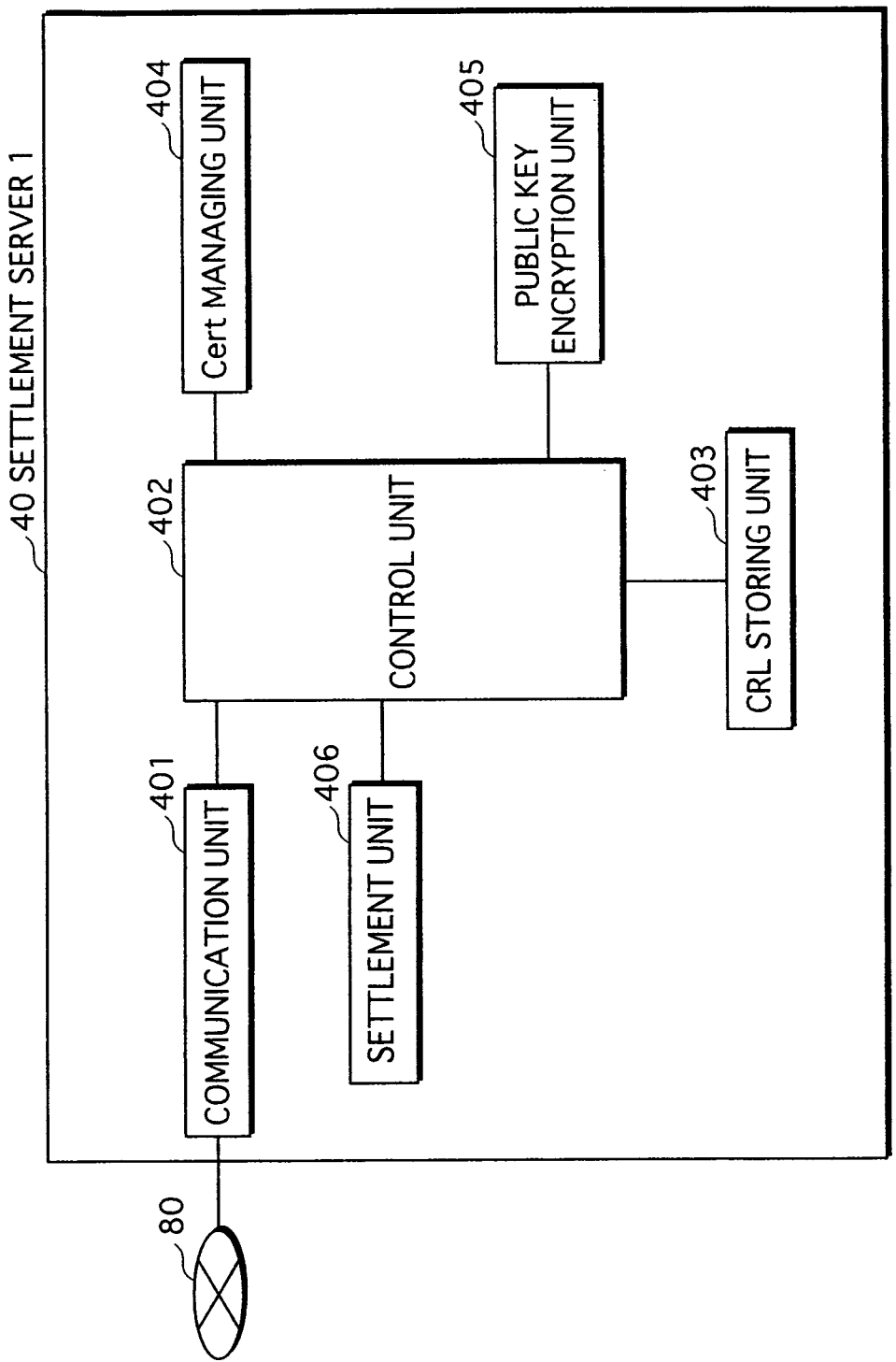
FIG. 12 is a functional block diagram showing a structure of a settlement server 1 (40)

FIG. 12 is a functional block diagram functionally showing the structure of the settlement server 1 (40). As FIG. 12 shows, the settlement server 1 (40) includes a communication unit 401, a control unit 402, a CRL storing unit 403, a Cert managing unit 404, a public key encryption unit 405 and a settlement unit 406.

The settlement server 1 (40) is, specifically, a computer system structured from a microprocessor, a ROM, a RAM, a network connection unit and so on, and performs settlement of payment for the content provided by the content server 1 (30) to the memory card 10.

(1) Communication Unit 401

The communication unit 401 is a network connection unit, and communicates with other devices via the network 80.

The communication unit 401 receives the public key PK_B, Cert_B', signature data for establishing a SAC, key information, a subtraction-completion notification and so on, and outputs these pieces of information to the control unit 402. The communication unit 401 also receives the public key certification Cert_B, signature data for establishing a SAC, key information, payment amount notifying information, an encrypted electronic receipt EREC_1 and so on from the control unit 402, and outputs these pieces of information to the memory card 10.

Moreover, the communication unit 401 is connected with the certificate authority 70 via the network 80. The communication unit 401 constantly receives the latest CRL from the certificate authority 70 via the network 80, and stores the received latest CRL in the CRL storing unit 403 via the control unit 402.

Also, the communication unit 401 receives a public key PK_0040 from the public key encryption unit 405 via the control unit 402, and transmits the received public key PK_0040 to the certificate authority 70 via the network 80. Also, the communication unit 401 receives an initial certification Cert_40, which is a public key certification corresponding to the public key PK_0040, from the certificate authority 70 via the network 80, and outputs the received initial certification Cert_0040 to the Cert managing unit 404 via the control unit 402. Here, the initial certification Cert_0040 is received and transmitted from and to the certificate authority 70 in safety. Note that the initial certification Cert_0040 may be notified by mail or the like, instead of transmitted via the network 80.

The communication unit 401 also receives the settlement request information 410 from the content server 1 (30) via the network 80, and outputs the received settlement request information to the control unit 402.

The communication unit 401 also receives encrypted payment amount notifying information and the encrypted electronic receipt EREC_1, and transmits the received encrypted payment amount notifying information and encrypted electronic receipt EREC_1 to the memory card 10 via the network 80.

(2) Control Unit 402

The control unit 402 gives instruction to each component, and control the whole of the settlement server 1 (40).

The following is a specific example of the processing performed by the control unit 402: after the public key encryption unit 405 establishes a SAC with the memory card 10, the control unit 402 receives the session key shared with the memory card 10 from the public key encryption 405 to receive and transmit information from and to the memory card 10; the control unit 402 encrypts the payment amount notifying information and the electronic receipt REC_1 received from the settlement unit 406 using the received session key as an encryption key, to generate the encrypted payment amount notification and the encrypted electronic receipt EREC_1; and the control unit 402 transmits the generated encrypted payment amount notification and encrypted electronic receipt EREC_1 to the memory card 10 via the communication unit 401.

(3) CRL Storing Unit 403

The CRL storing unit 403 has the same function as the CRL storing unit 303 which is a component included in the content server 1 (30). Therefore, the explanation thereof is omitted here.

(4) Cert Managing Unit 404

The Cert managing unit 404 receives the initial certification Cert_0040 from the certificate authority 70, and stores therein the received initial certification Cert_0040.

FIG. 13B shows a data structure of the initial certification Cert_0040 (320), which is a public key certification which the settlement server 1 (40) receives from the certificate authority 70. As FIG. 13B shows, the Cert_0040 (320) includes a device ID (ID_0040) for uniquely identifying the settlement server 1 (40), the above-described public key PK_0040, and signature data SIG_0040CA generated by the certificate authority 70 for the device ID (ID_0040) and the public key PK_0040.

The Cert managing unit 404 manages registration information of devices to which the public key certification is issued by the public key encryption unit 405. The registration information includes the public key of the registered device, the membership number assigned to the device, the network address of the device, information of the user of the device and so on. The registration information is used for managing registered devices and the users. The registration information is also used for establishing a SAC with the memory card 10.

Here, since the settlement server 1 (40) is a server for processing the settlement of the payment for the contents provided by the content server 1 (30), the membership number to be assigned by the settlement server 1 (40) to the device is the same as the membership number assigned by the content server 1 (30). Specifically, the content server 1 (30) and the settlement server 1 (40) assign the same membership number "NO_0010" to the memory card 10.

(5) Public Key Encryption Unit 405

<Request for Initial Certification Cert_0040>

Prior to the communication with the memory card 10, a public key certification is issued by the certificate authority 70 for the public key encryption unit 405.

More specifically, the public key encryption unit 405 generates the public key PK_0040 from the initial private key SK_0040 prestored therein. The public key encryption unit 405 transmits its own device ID "ID_0040" prestored therein and the generated public key PK_0040 to the certificate authority 70 via the control unit 402 and the communication unit 401.

(Registration of Memory Card 10)

In the service subscription processing and the registration processing, the public key encryption unit 405 establishes a SAC with the memory card 10 in accordance with an instruction from the control unit 402.

The public key encryption unit 405 generates a private key $K_{S\_B}$ and calculates $K_{p\_B}=K_{S\_B}*G(\mod p)$ to generate the public key $K_{p\_B}$. The public key encryption unit 405 transmits the generated public key $K_{p\_B}$ to the memory card 10 via the SAC. Here, assume that the equation of the elliptic curve $y^2=x^3+ax+b(\mod p)$ has already been given.

The public key encryption unit 405 receives the public key PK_B from the memory card 10 via the SAC, and generates the public key certification Cert_B (140) based on the received public key PK_B. The data structure of the Cert_B (140) is shown in FIG. 6A. The public key encryption unit 405 transmits the generated Cert_B (140) to the memory card 10 via the SAC.

<Settlement Processing>

In the settlement processing performed with the memory card 10, the public key encryption unit 405 establishes a SAC with the memory card 10 in accordance with an instruction from the control unit 402

(6) Settlement Unit 406

The settlement unit 406 receives the settlement request information 410 shown in FIG. 14 from the control unit 402. The settlement unit 406 reads an amount of money 1200 from the settlement request information 410. The settlement unit 406 generates payment amount notifying information indicating "1200 yen" and outputs the generated payment amount notifying information to the control unit 402.

The settlement unit 406 receives subtraction-completion notifying information indicating that the subtraction from the electronic money information has already been completed from the memory card 10 via the control unit 402 and the communication unit 401. Upon receiving the subtraction-completion notifying information, the settlement unit 406 generates an electronic receipt (REC_1) 420 as FIG. 15 shows, and outputs the generated electronic receipt (REC_1) 420 to the control unit 402.

The electronic receipt (REC_1) 420 includes a service ID (SID_0321B), the membership number NO_0010, a settlement number 0322001, an amount of money 1200, and a date of use Mar. 22, 2005.

The service ID (SID_0321B) indicates a type of the service registered with the memory card 10. The membership number (NO_0010) indicates the membership number of the memory card 10. The usage number (0322001) indicates that the relevant settlement processing is the first settlement processing performed with the memory card 10 on March 22. The amount of money (1200) indicates the amount of money paid in the settlement processing. The date of use (Mar. 22, 2005) indicates the date on which the settlement processing was performed.

5. Content Server 2 (50)

The content server 2 (50) is a server device that distributes a content as music data via the network 80.

FIG. 13C shows a data structure of an initial certification Cert_0050 (340), which is a public key certification which the content server 2 (50) receives from the certificate authority 70. As FIG. 13C shows, the Cert_0050 (340) includes a device ID (ID_0050) for uniquely identifying the content server 2 (50), the public key PK_0050 of the content server 2 (50), and signature data SIG_0050CA generated by the certificate authority 70 for the device ID (ID_0050) and the public key PK_0050.

The content server 2 (50) firstly establishes a SAC with the memory card 10 using the initial certification Cert_0050, and transmits the public key certification Cert_C (see FIG. 7A) to the memory card 10 via the SAC. Next, the content server 2 (50) establishes a SAC with the memory card 10 using the Cert_C' (see FIG. 7B) generated by the memory card 10, based on the Cert_C, and transmits the encrypted content and the encrypted content key to the memory card 10 via the SAC.

The structure and the functions of the content server 2 (50) is the same as the content server 1 (30). Therefore, the structure is not illustrated and an explanation of the details thereof is omitted here.

6. Settlement Server 2 (60)

The settlement server 2 (60) is a device for performing settlement of payments for the contents provided by the content server 2 (50) to the memory card 10.

FIG. 13D shows a data structure of an initial certification Cert_0060 (360), which is a public key certification which the settlement server 2 (60) receives from the certificate authority 70. As FIG. 13B shows, the Cert_0040 (320) includes a device ID (ID_0060) for uniquely identifying the settlement server 2 (60), the public key PK_0060 of the settlement server 2 (60), and signature data SIG_0060CA generated by the certificate authority 70 for the device ID (ID_0060) and the public key PK_0060.

The settlement server 2 (60) firstly establishes a SAC with the memory card 10 using the initial certification Cert_0060, and transmits the public key certification Cert_D (see FIG. 8A) to the memory card 10 via the SAC. Next, the settlement server 2 (60) establishes a SAC with the memory card 10 using the Cert_D' (see FIG. 8B) generated by the memory card 10, based on the Cert_D, and performs the settlement processing with the memory card 10 via the SAC.

The structure and the functions of the settlement server 2 (60) is the same as the settlement server 1 (40). Therefore, the structure is not illustrated and an explanation of the details thereof is omitted here.

7. Certificate Authority 70

The certificate authority 70 is a device that issues a signature at a data exchange for certificating that a data source on the network 80 is a reliable organization or a reliable device.

<Operations>

The following describes the operations performed by the content providing system 1.

1. The Whole System

Figure 16:
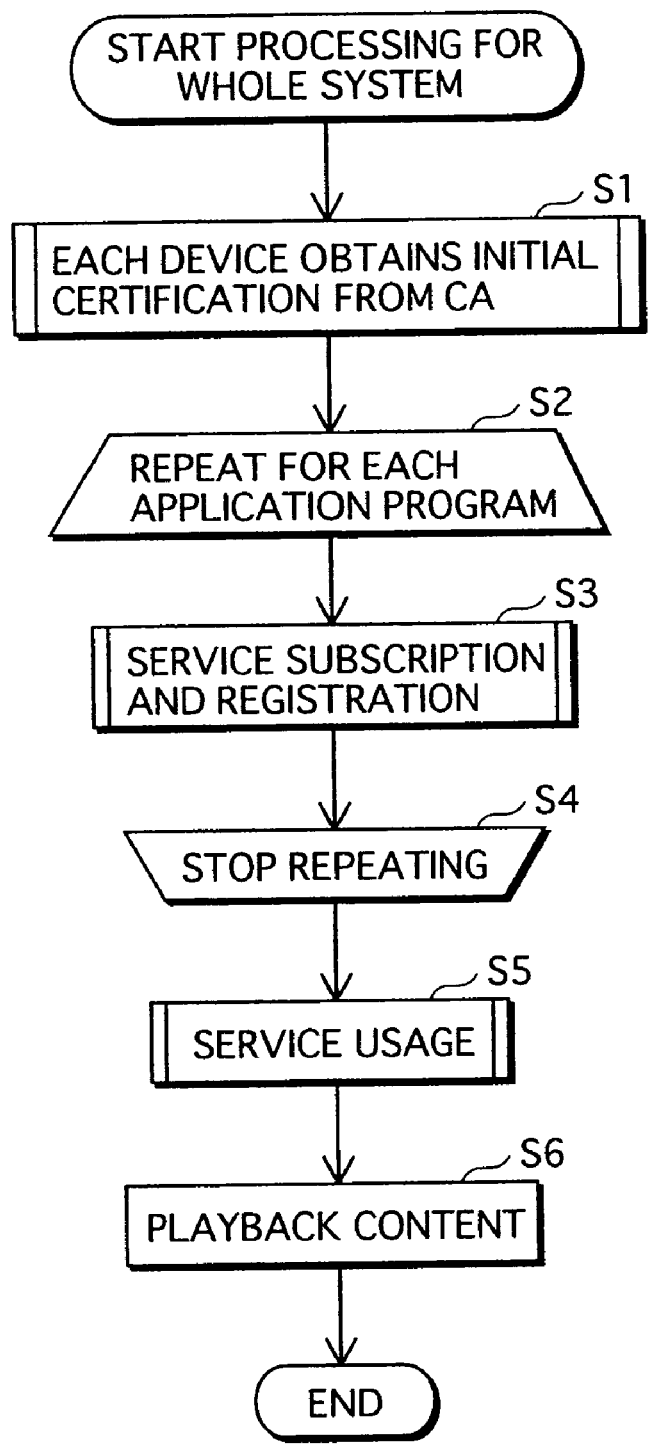
FIG. 16 is a flowchart showing operations performed by the whole of the content providing system.

FIG. 16 is a flowchart showing operations performed by the whole of the content providing system 1.

Firstly, each of the memory card 10, the content server 1 (30), the settlement server 1 (40), the content server 2 (50) and the settlement server 2 (60) obtains the initial certification from the certificate authority 70 (CA) (Step S1). Next, each device repeats, for each application program, Steps S2 to S4.

The memory card 10 and a corresponding server perform, for each application program, service subscription processing and registration processing (Step S3)

After Step S3 has been finished for all the application programs downloaded in the memory card 10 (Step S4), the memory card 10 and the server perform the service usage processing (Step S5). Then, the terminal device 20 plays back the content (Step S6).

2. Initial Certification Obtaining Processing

Figure 17:
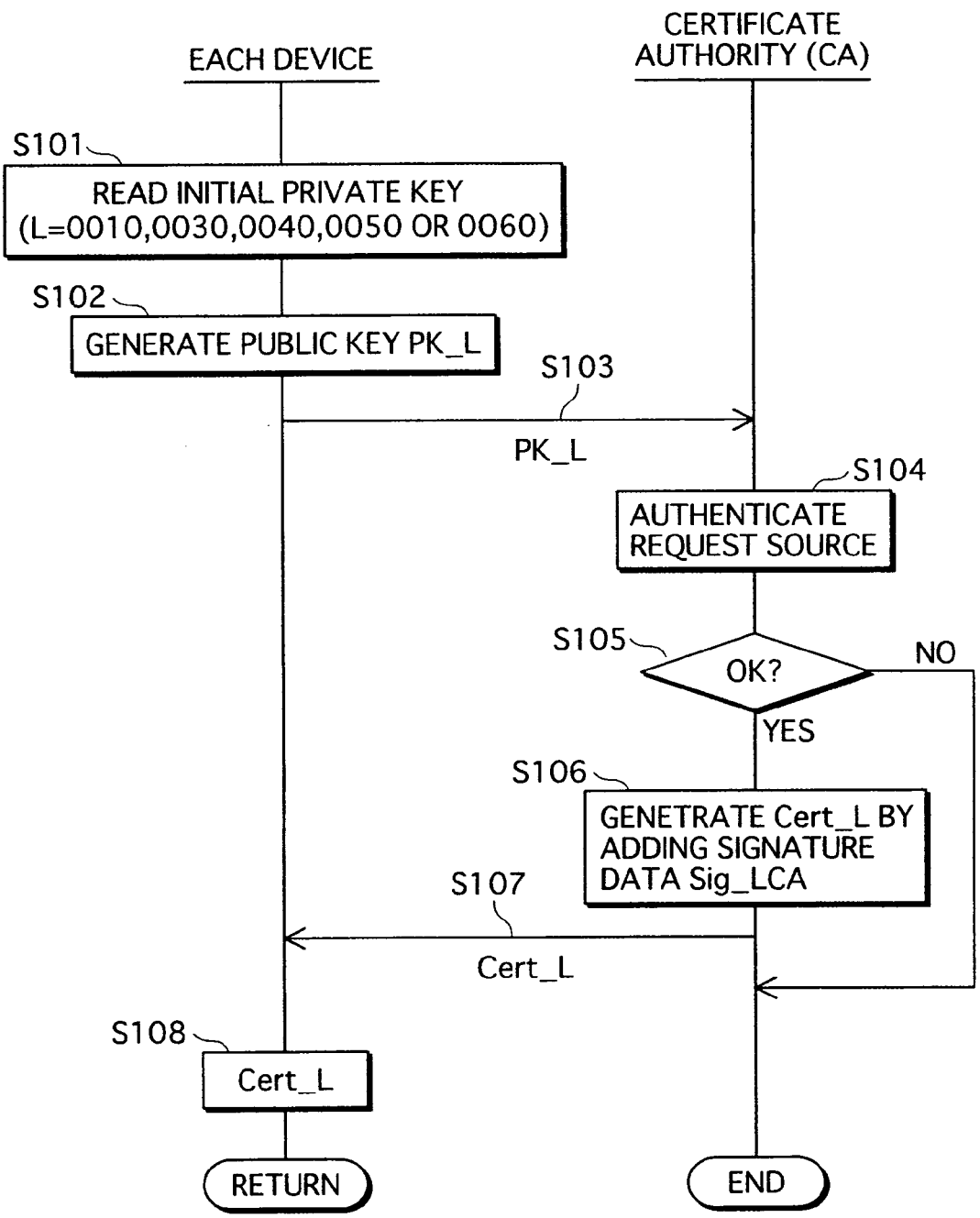
FIG. 17 is a flowchart showing operations performed by each device for obtaining an initial certification from a certificate authority.

FIG. 17 is a flowchart showing operations performed between each device and the certificate authority 70 for obtaining the initial certification. The operations shown in FIG. 17 are the details of Step S1 in the flowchart of FIG. 16. Note that the phrase "each device" represents each of the memory card 10, the content server 1 (30), the settlement server 1 (40), the content server 2 (50) and the settlement server 2 (60).

Firstly, each device reads an initial private key SK_L. Here, L=0010, 0030, 0040, 0050 or 0060 (Step S101). Next, each device generates a public key PK_L based on the initial private key SK_L (Step S102). Here, any algorithm may be used for generating the public key PK_L from the initial private key SK_L. For example, the RSA cryptosystem may be used.

Each device transmits information including the public key PK_L and its own device ID stored therein to the certificate authority 70. The certificate authority 70 receives the information including the public key PK_L and the device ID (Step S103).

The certificate authority 70 ascertain, as to the transmission source of the information received in Step S103 (the request source of the public key certification), whether the public key, the mail address, the user, the organization the user belonging to and so on surely exist and are correct (Step S104).

If the request source is invalid (NO in Step S105), the certificate authority 70 finishes the processing.

IF the request source is valid (YES in Step S105), the certificate authority 70 adds signature data Sig_LCA to the received public key PK_L and device ID, to generate an initial certification Cert_L (Step S106). The certificate authority 70 transmits the generated initial certification Cert_L to each device as the request source. Each device receives the initial certification Cert_L (Step S107).

Each device stores the received initial certification Cert_L (Step S108). More specifically, the memory card 10 stores the Cert_0010 in the user area 116 of the storing unit 104, and the content server 1 (30), the settlement server 1 (40), the content server 2 (50) and the settlement server 2 (60) respectively store the Cert_0030, the Cert_0040, the Cert_0050 and the Cert_0060 in their respective Cert managing unit.

Upon receiving the public key certification from the certificate authority 70, each of the memory card 10, the content server 1 (30), the settlement server 1 (40), the content server 2 (50) and the settlement server 2 (60) performs the next Step S2.

3. Service Subscription and Registration Processing

Figure 18:
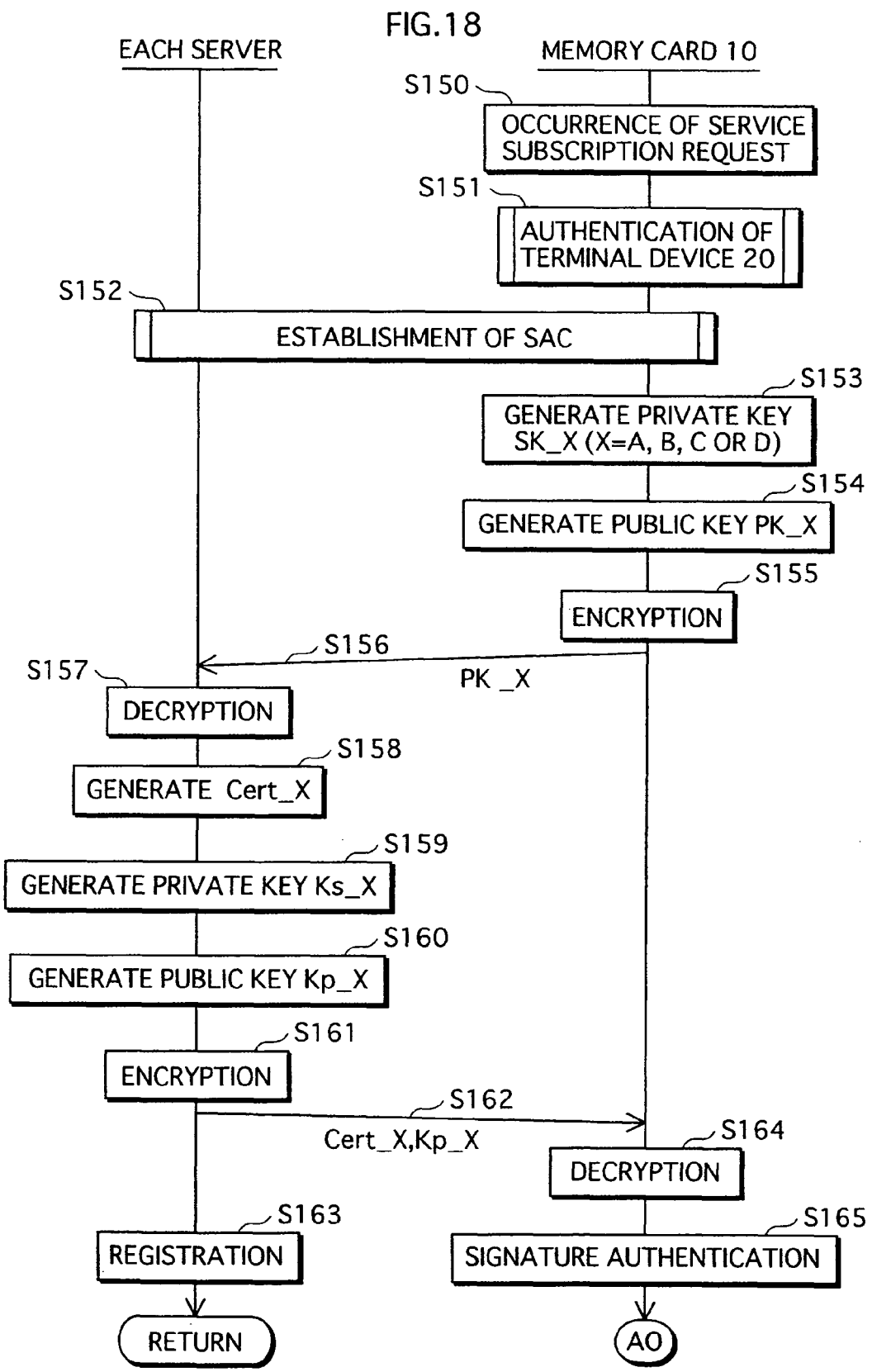
FIG. 18 is a flowchart showing operations for service subscription and registration, followed by FIG. 19.
Figure 19:
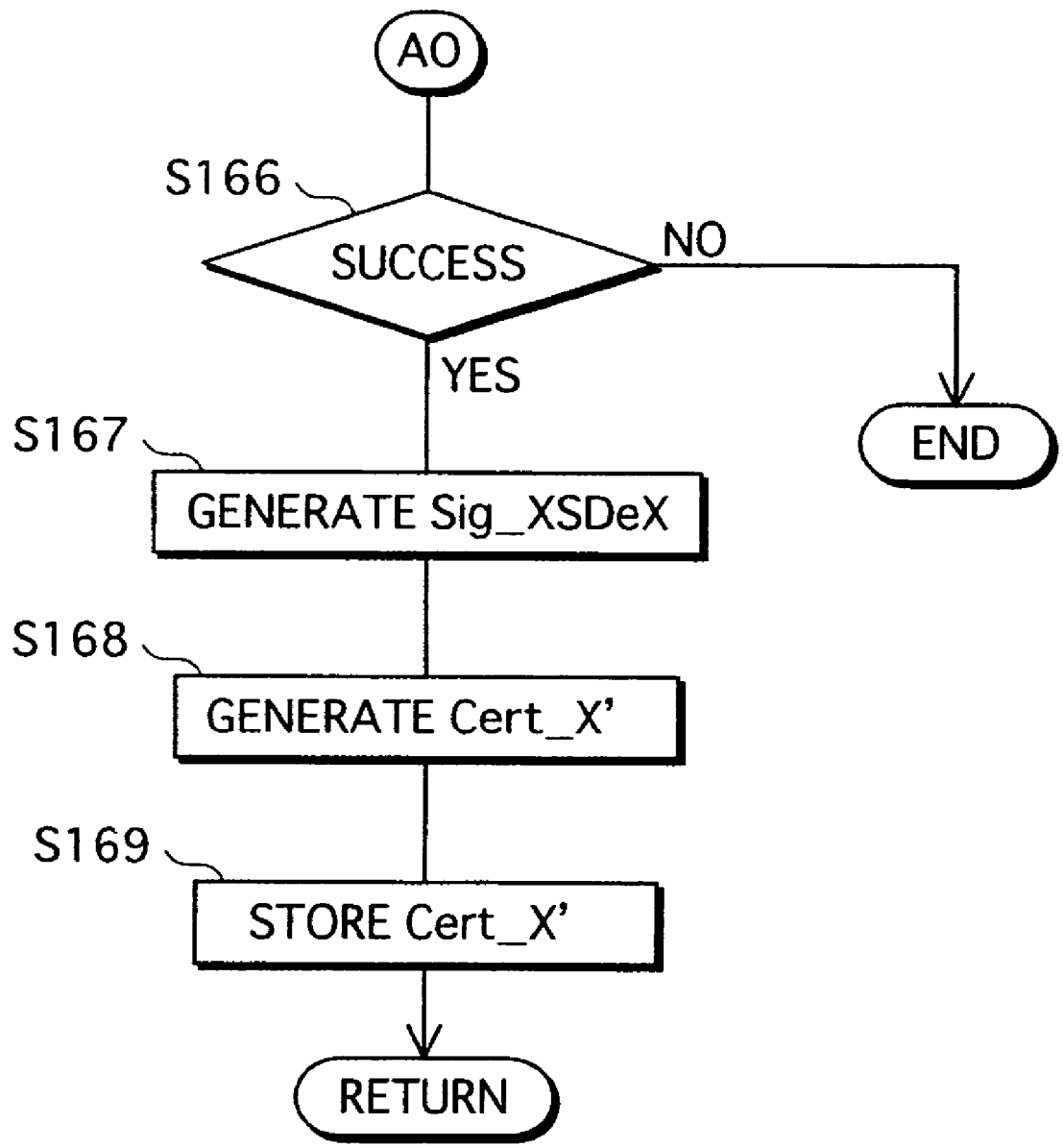
FIG. 19 is a flowchart showing operations for service subscription and registration, continued from FIG. 18.

FIG. 18 and FIG. 19 are flowcharts showing operations for the service subscription and registration processing performed among the memory card 10, the content server 1 (30), the settlement server 1 (40), the content server 2 (50) and the settlement server 2 (60). Note that the operations shown in FIG. 18 and FIG. 19 are the details of Step S3 in the flowchart of FIG. 16.

In the memory card 10, a service subscription request to the content server 1 (30), the settlement server 1 (40), the content server 2 (50) and the settlement server 2 (60) occurs (Step S150). The service subscription request occurs, for example, when an application program is downloaded into the memory card 10.

For simplification, each of the content server 1 (30), the settlement server 1 (40), the content server 2 (50) and the settlement server 2 (60) may be called "the server" or "each server" in the following explanation.

The authentication unit 106 of the memory card 10 authenticates the terminal device 20 in which the memory card 10 is inserted (Step S151). After that, the memory card 10 and each server perform processing for establishing SACs (Step S152).

The memory card 10 generates, using a random number generator, a private key SK_X (X=A, B, C or D) specific to each application program (Step S153).

The public key encryption unit 107 generates, based on the private key SK_X, calculates PK_X=SK_X*G(mod p) to generate a public key PK_X (Step S154). Next, the memory card 10 encrypts the generated public key PK_X using the session key as an encryption key (Step S155), and transmits the encrypted public key PK_X to each server via the terminal device 20 and the network 80. Each server receives the encrypted public key PK_X (Step S156).

Each server decrypts the encrypted public key PK_X using the session key (Step S157).

Next, each server generates a public key certification Cert_X for the public key PK_X received from the memory card 10 (Step S158). Then, each server generates a private key $K_S\_X$ using a random number generator (Step S159), and generates a public key $K_P\_X=K_S\_X*G$ from the generated private key $K_S\_X$ (Step S160). Each server encrypts the public key certification Cert_X and the public key $K_P\_X$ using the session key as the encryption key (Step S161), and transmits the encrypted Cert_X and $K_P\_X$ to the memory card 10 via the network 80 and the terminal device 20. The memory card 10 receives the encrypted Cert_X and $K_P\_X$ (Step S162).

Each server generates registration information for the memory card 10, and manages the information (Step S163).

The memory card 10 decrypts the received Cert_X and $K_P\_X$ using the session key (Step S164), and authenticate signature data Sig_0010X included in the decrypted public key certification Cert_X using the decrypted $K_P\_X$ (Step S165).

If the signature authentication has failed (NO in Step S166), the memory card 10 returns to the processing in the Step S3. If the signature authentication has succeeded (YES in Step S166), the memory card 10 generates signature data Sig_XSDeX for the Cert_X (Step S167), and adds the signature data Sig_XSDeX to the Cert_X to generate Cert_X' (Step S168).

The memory card 10 stores the generated Cert_X' in the user area 116 of the storing unit 104 (Step S169).

4. SAC Establishment Processing 1

Figure 20:
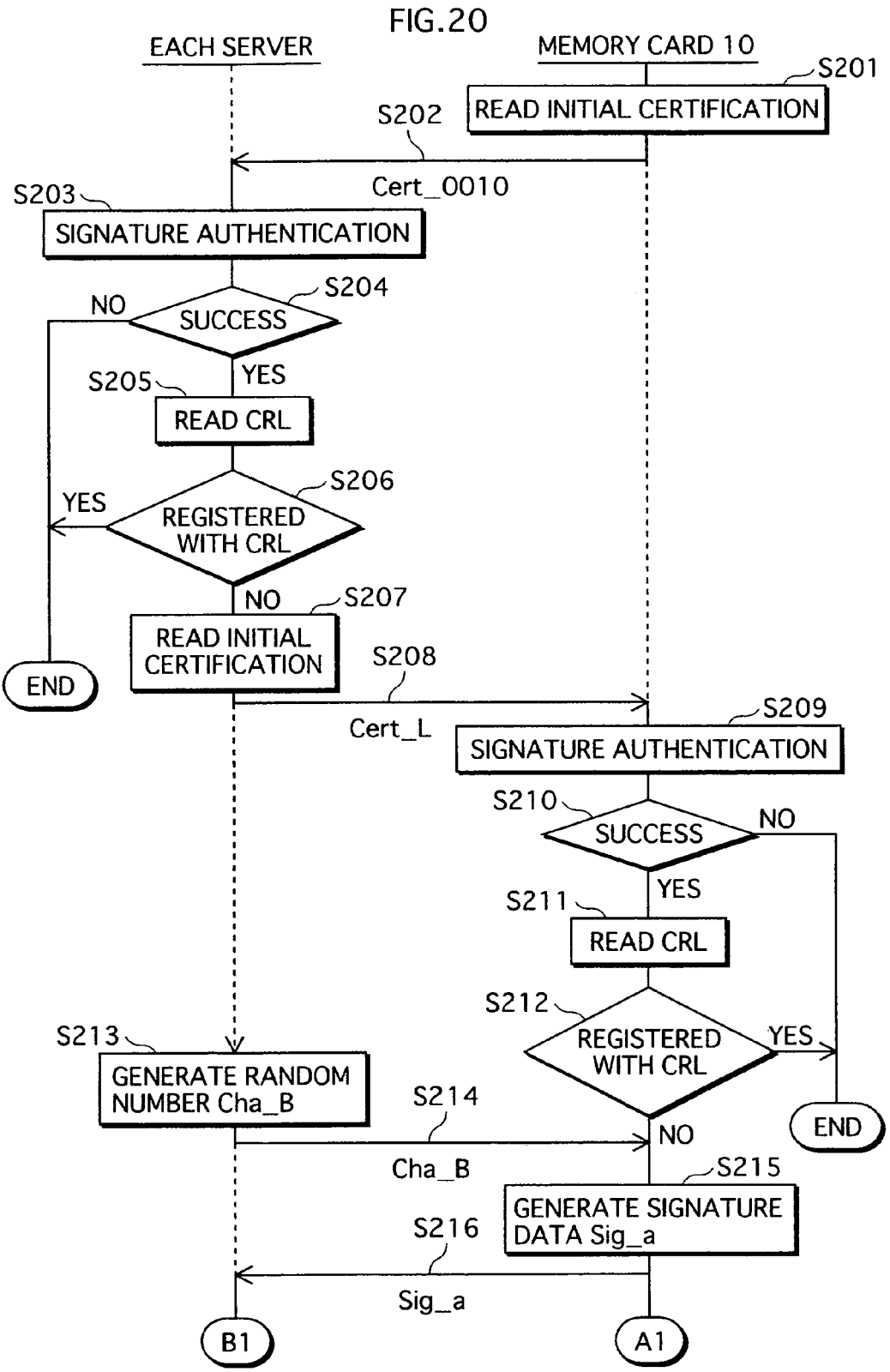
FIG. 20 is a flowchart showing operations performed during the service subscription and registration, for establishing a SAC between each server and a memory card 10, followed by FIG. 21.
Figure 21:
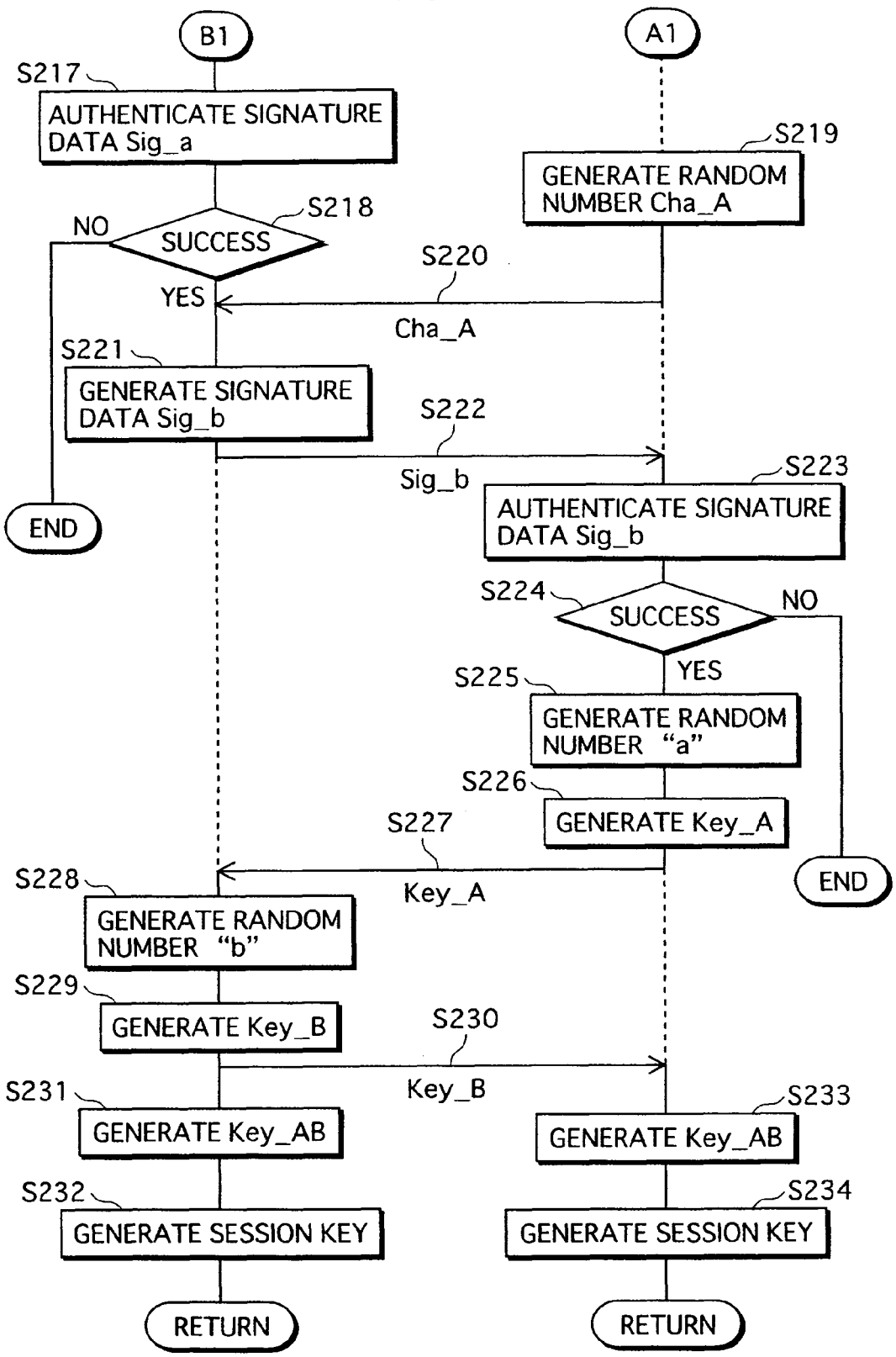
FIG. 21 is a flowchart showing operations performed during the service subscription and registration, for establishing a SAC between each server and a memory card 10, continued from FIG. 20.

FIG. 20 and FIG. 21 are flowcharts showing operations for establishing SAC between the memory card 10 and each server for service subscription and registrations processing. Operations shown in FIG. 20 and FIG. 21 are details of Step S152 in the flowchart of FIG. 18.

Here, assume that Gen( ) is a key generating function, and Y is a parameter unique to the system. Also, assume that (X, Gen (Y, Z))=Gen(Y, Gen (X, Z)) is satisfied. The key generating function can be realized by a well-known technique. Therefore, it is not explained in detail here.

Firstly, the access control unit 109 of the memory card 10 reads the initial certification Cert_0010 from the user area 116 (Step S201). The access control unit 109 transmits the initial certification Cert_0010 to each server via the input/output unit 101, the terminal device 20 and the network 80. The communication unit of each server receives the initial certification Cert_0010 (Step S202).

The public key encryption unit of each server applies, using the public key PK_CA of the certificate authority 70, a signature authentication algorithm to the signature data Sig_0010CA included in the initial certification Cert_0010 to authenticate the signature data (Step S203). Note that it is assumed that the public key PK_CA of the certificate authority 70 is known to each server. If the result of the authentication is the failure (NO in Step S204), each server finishes the processing. If the result of the authentication is the success (YES in Step S204), the public key encryption unit of each server reads the CRL from the CRL storing unit via the control unit (Step S205), and judges whether the ID_0010 included in the public key certification Cert_0010 is registered with the CRL.

If it is judged that the ID_0010 is registered with the CRL (YES in Step S206), each server finishes the processing. If it is judged that the ID_0010 is not registered with the CRL (NO in Step S206), the public key encryption unit of each server reads the initial certification Cert_L from the Cert managing unit via the control unit (Step S207). Each server transmits the initial certification Cert_L to the memory card 10 via the network 80 and the terminal device 20, and the input/output unit 101 of the memory card 10 receives the Cert_L (Step S208).

Upon receiving the public key certification Cert_L, the public key encryption unit 107 of the memory card 10 applies a signature authentication algorithm to the signature data Sig_LCA included in the Cert_L using the public key PK_CA of the certificate authority 70, to authenticate the signature (Step S209). Note that the public key PK_CA of the certificate authority 70 is known to the memory card 10. If the authentication has failed (NO in Step S210), the memory card 10 finishes the processing. If the authentication has succeeded (YES in Step S210), the public key encryption unit 107 reads the CRL stored therein (Step S211), and judges whether the ID_L included in the public key certification Cert_L is registered with the CRL.

If it is judged that the ID_L is registered with the CRL (YES in Step S212), the memory card 10 finishes the processing. If it is judged that the ID_L is not registered with the CRL (NO in Step S212), the memory card 10 continues the processing.

Following the processing in Step S207, the public key encryption unit of each server generates a random number Cha_B (Step S213). The communication unit of each server transmits the random number Cha_B to the memory card 10 via the network 80 and the terminal device 20, and the input/output unit 101 of the memory card 10 receives the random number Cha_B (Step S214).

Upon receiving the random number Cha_B, the public key encryption unit 107 of the memory card 10 outputs the random number Cha_B to the TRM control unit 112 via the access control unit 109. The TRM control unit 112 reads the initial private key SK_0010 from the internal memory 114 via the internal memory input/output unit 113. The TRM control unit 112 applies a signature algorithm to the random number Cha_B using the initial private key SK_0010 to generate signature data Sig_a (Step S215). The TRM control unit 112 outputs the generated signature data Sig_a to the access control unit 109.

The access control unit 109 transmits the generated signature data Sig_a to each server via the input/output unit 101, the terminal device 20 and the network 80, and the communication unit of each server receives the signature data Sig_a (Step S216).

Upon receiving the signature data Sig_a, the public key encryption unit of each server applies a signature authentication algorithm to the signature data Sig_a using the public key PK_0010 included in the Cert_0010 received in Step S202, to authenticate the signature (Step S217). If the result of the authentication is the failure (NO in Step S218), each server finishes the processing. If the result of the authentication is the success (YES in Step S218), each server continues the processing.

Meanwhile, following the processing in Step S215, the memory card 10 generates a random number Cha_A by the public key encryption unit 107 (Step S219). The public key encryption unit 107 transmits the generated random number Cha_A to each server via the terminal device 20 and the network 80, and the communication unit of each server receives the random number Cha_A (Step S220).

The public key encryption unit of each server receives the random number Cha_A, and applies a signature algorithm to the received random number Cha_A using the private key SK_L store therein, to generate signature data Sig_b (Step S221). Each server transmits the generated signature data Sig_b to the memory card 10 via the network 80 and the terminal device 20, and the input/output unit of the memory card 101 receives the signature data Sig_b (Step S222).

Upon receiving the signature data Sig_b, the public key encryption unit 107 of the memory card 10 applies a signature authentication algorithm to the signature data Sig_b using the public key PK_L included in the Cert_L received in Step S208, to authenticate the signature (Step S223). If the result of the authentication is the failure (NO in Step S224), the memory card 10 finishes the processing. If the result of the authentication is the success (YES in Step S224), the public key encryption unit 107 of the memory card 10 generates a random number "a" (Step S225), and generates Key_A=Gen (a, Y) using the generated random number "a" (Step S226). The memory card 10 transmits the generated Key_A to each server via the terminal device 20 and the network 80, and the communication unit of each server receives the Key_A (Step S227).

Upon receiving the Key_A, the public key encryption unit of each server generates a random number "b" (Step S228), and generates Key_B=Gen(b, Y) using the generated random number "b" (Step S229). The communication unit of each server transmits the Key_B generated by the public key encryption unit to the memory card 10 via the network 80 and the terminal device 20, and the input/output unit 101 of the memory card 10 receives the Key_B (Step S230).

Also, the pubic key encryption unit of each server generates Key_AB=Gen(b, Key_A)=Gen(b, Gen (a, Y)) using the random number "b" generated in Step S228 and the Key_A received in Step S227 (Step S231), and outputs the generated Key_AB as a session key to the control unit (Step S232). After that, processing performed by each server returns to Step S153 in FIG. 18, and continues the processing.

Meanwhile, upon receiving the Key_B in Step S230, the public key encryption unit 107 of the memory card 10 generate Key_AB=Gen(a, Key_B)=Gen(a, Gen (b, Y)) using the Key_B and the random number "a" generated in Step S225 (Step S233), and considers the generated Key_AB as a session key (Step S234). After that, processing performed by the memory card 10 returns to the Step S153 in FIG. 18, and continues the processing.

5. Operations for Service Usage Processing

Figure 22:
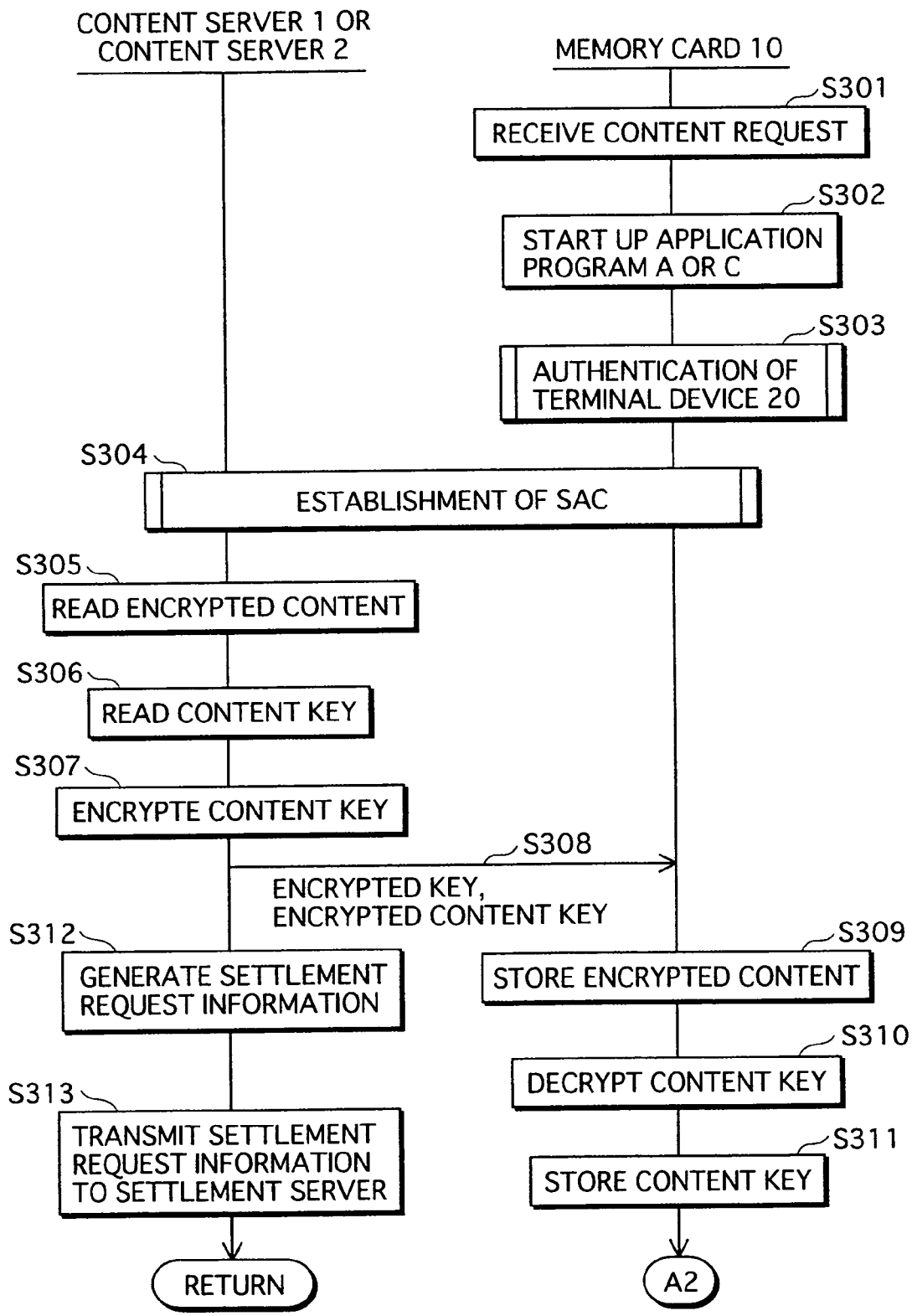
FIG. 22 is a flowchart showing operations for service usage, followed by FIG. 23.
Figure 23:
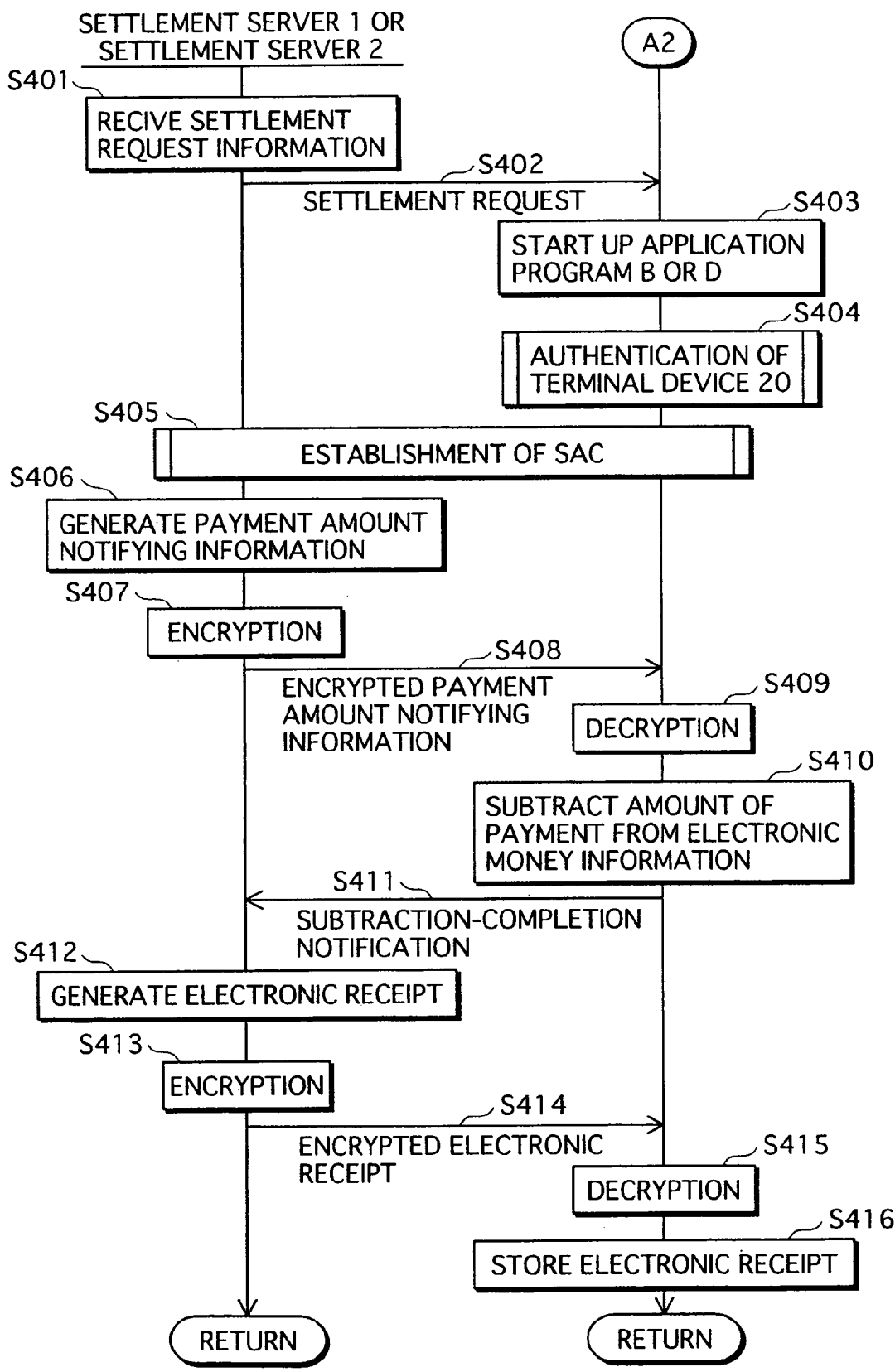
FIG. 23 is a flowchart showing operations for service usage, continued from FIG. 22.

FIG. 22 and FIG. 23 are flowcharts showing operations for the service usage processing. Note that the operations shown in FIG. 22 and FIG. 23 are the details of Step S5 in the flowchart of FIG. 16.

Upon receiving a request for a content from the terminal device 20 (Step S301), the memory card 10 starts up the application program A or the application program C in accordance with the requested content (Step S302).

The memory card 10 authenticates the terminal device 20 (Step S303), and then performs processing for establishing a SAC with the content server 1 (30) or the content server 2 (50) corresponding to the application program A or the application program C (Step S304).

The content server 1 (30) or the content server 2 (50) whichever has established the SAC with the memory card 10 reads the encrypted content from the encrypted content storing unit (Step S305), and reads the content key from the content key storing unit (Step S306).

Next, the content server 1 (30) or the content server 2 (50) encrypts the content key using the session key shared for the SAC, to generate an encrypted content key (Step S307). The content server 1 (30) or the content server 2 (50) transmits the encrypted content and the encrypted content key to the memory card 10 via the network 80 and the terminal device 20, and the memory card 10 receives the encrypted content and the encrypted content key (Step S308).

The access control unit 109 of the memory card 10 stores the encrypted content in the user area 116 (Step S309). The public key encryption unit 107 decrypts the encrypted content using the session key to generate a content key (Step S310). Then, the access control unit 109 stores the decrypted content key in the secure area 115 (Step S311).

The content server 1 (30) or the content server 2 (50) generates settlement request information (Step S312). The content server 1 (30) transmits the generated settlement request information to the settlement server 1 (40) via the network 80, and the content server 2 (50) transmits the generated settlement request information to the settlement server 2 (40) (Step S313). After that, the processing performed by the content server 1 (30) and the processing performed by the content server 2 (50) return to the flowchart of FIG. 16.

The settlement server 1 (40) or the settlement server 2 (60) receives the settlement request information (Step S401). The settlement server 1 (40) or the settlement server 2 (60) identifies the memory card 10 based on the received settlement request information, and transmits a settlement request to the memory card 10. The memory card 10 receives the settlement request (Step S402).

If the settlement request is from the settlement server 1 (40), the memory card 10 starts up the application program B, and the settlement request is from the settlement server 2 (60), the memory card 10 starts up the application program D (Step S403).

Next, the memory card 10 authenticates the terminal device 20 (Step S404), and then performs processing for establishing SAC with the settlement server 1 (40) or the settlement server 2 (60) (Step S405).

The settlement server 1 (40) or the settlement server 2 (60) whichever has established the SAC with the memory card 10 generates payment amount notifying information (Step S406), and encrypts the generated payment amount notifying information using the session key shared for the SAC as the encryption key, to generate encrypted payment amount notifying information (Step S407). The settlement server 1 (40) or the settlement server 2 (60) transmits the generated encrypted payment amount notifying information to the memory card 10, and the memory card 19 receives the encrypted payment amount notifying information (Step S408).

The public key encryption unit 107 of the memory card 10 decrypts the payment amount notifying information using the session key (Step S409), and instructs the access control unit 109 to perform the subtraction from the electronic money information. The access control unit 109 instructs the TRM control unit 112 to perform the subtraction from the electronic money information, and the TRM control unit 112 subtracts the amount of payment from the amount indicated by the electronic money information stored in the internal memory 114 (Step S410).

After that, the memory card 10 transmits the subtraction-completion notification to the settlement server 1 (40) or the settlement server 2 (60), and the settlement server (50) or the settlement server 2 (60) receives the settlement server 2 (Step S411).

The settlement unit of the settlement server 1 (40) or the settlement server 2 (60) whichever has received the subtraction-completion notification generates the electronic receipt (Step S412), and encrypts the generated electronic receipt using the session key to generate the encrypted electronic receipt (Step S413). The settlement server 1 (40) or the settlement server 2 (60) transmits the encrypted electronic receipt to the memory card 10, and the memory card 10 receives the encrypted electronic receipt (Step S414)

The public key encryption unit 107 of the memory card 10 decrypts the encrypted electronic receipt using the session key (Step S415), and stores the electronic receipt in the secure area 115 (Step S416).

The processing performed by the memory card 10, the settlement server 1 (40) and the settlement server 2 (60) returns to the flowchart of FIG. 16.

6. SAC Establishment Processing 2

Figure 24:
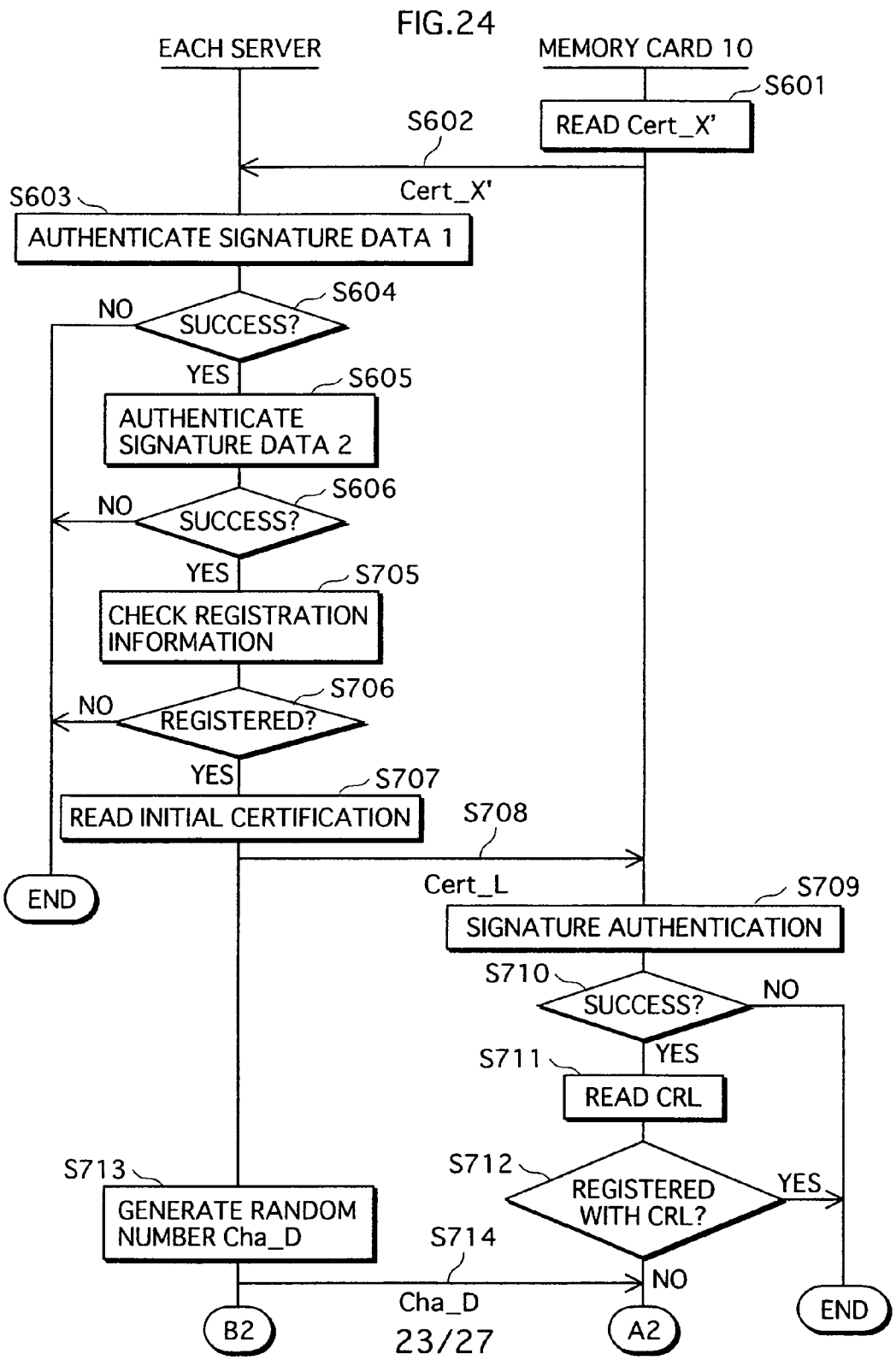
FIG. 24 is a flowchart showing operations performed during the service usage, for establishing a SAC between each server and a memory card 10, followed by FIG. 25.
Figure 25:
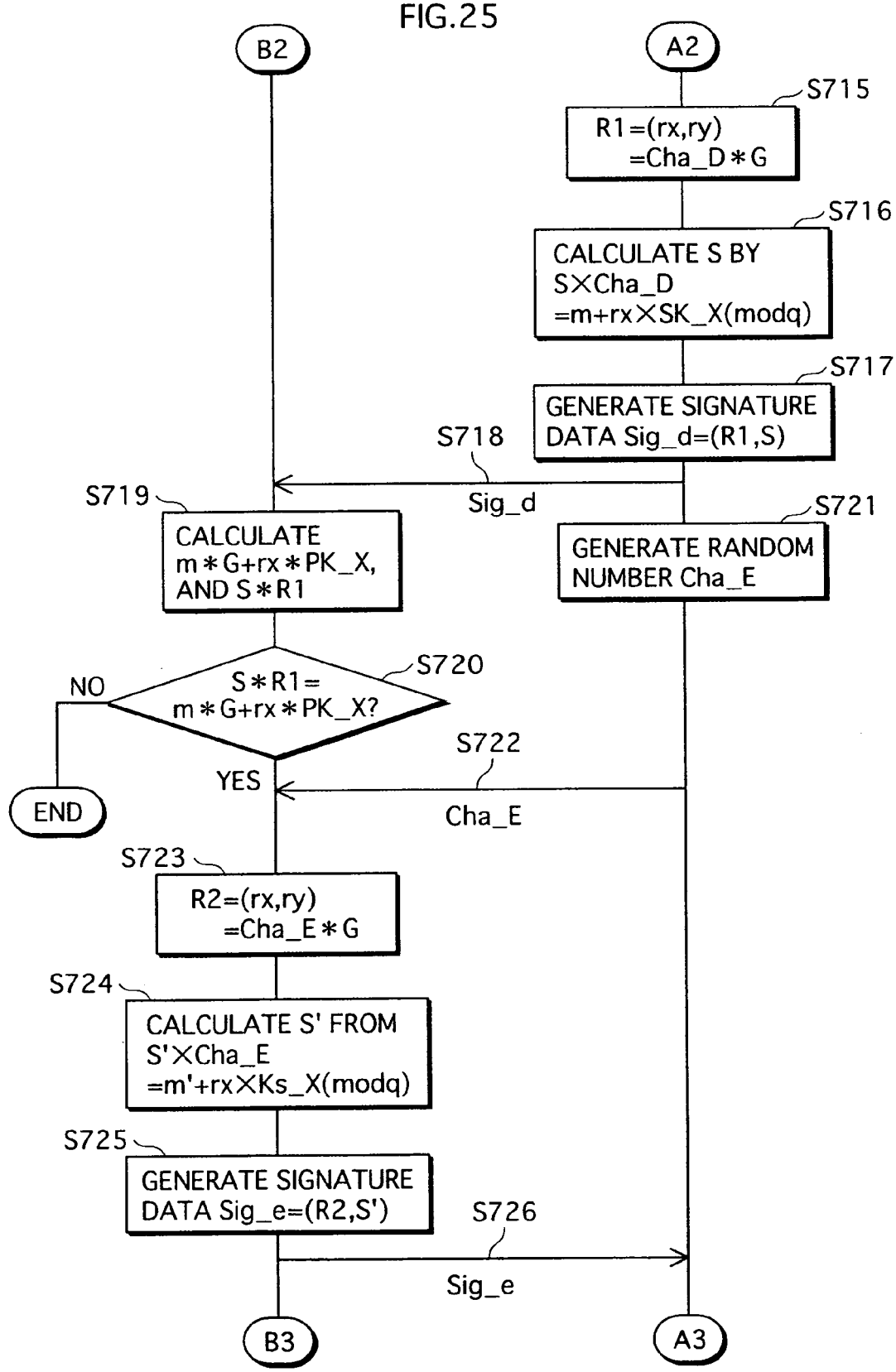
FIG. 25 is a flowchart showing operations performed during the service usage, for establishing a SAC between each server and a memory card 10, continued from FIG. 24 and followed by FIG. 26.
Figure 26:
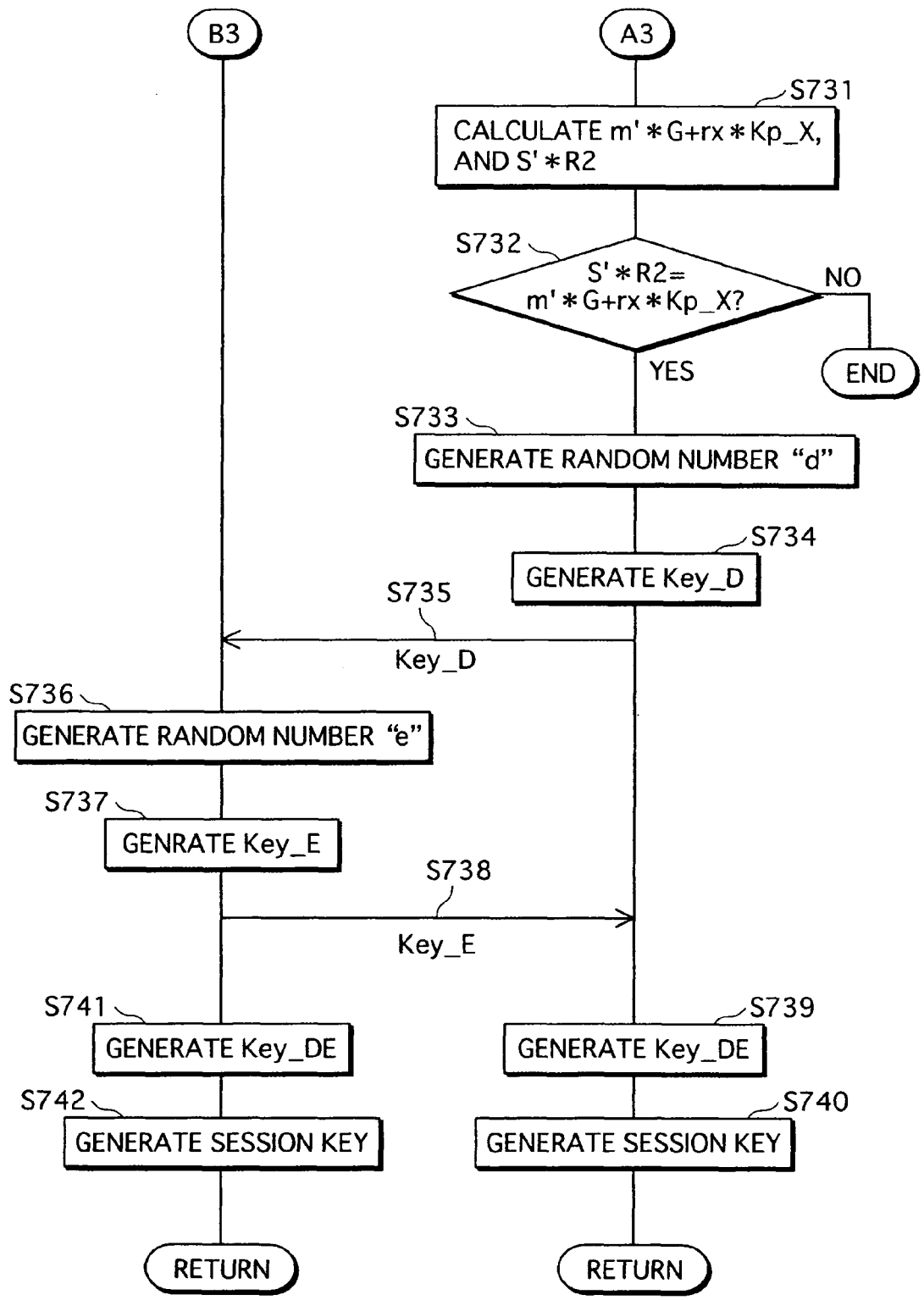
FIG. 26 is a flowchart showing operations performed during the service usage, for establishing a SAC between each server and a memory card 10, continued from FIG. 25.

FIG. 24, FIG. 25 and FIG. 26 are flowcharts showing the operations performed by the memory card 10 and each server for establishing SAC for using services. The operations shown in FIG. 24, FIG. 25 and FIG. 26 are the details of Step S304 in the flowchart of FIG. 22 and Step S405 in the flowchart of FIG. 23.

Here, assume that Gen( ) is a key generating function, and Y is a parameter unique to the system. Also, assume that (X, Gen (Y, Z))=Gen(Y, Gen (X, Z)) is satisfied.

Firstly, the memory card 10 reads the public key certification Cert_X' stored in the user area 116 (Step S601). Here, X is A, B, C or D, and the memory card 10 reads a public key certification corresponding to the application program that is running.

The memory card 10 transmits the Cert_X' to each server via the terminal device 20 and the network 80, and the communication unit of each server receives the Cert_X' (Step S602).

Each server authenticates the signature data 1 included in the received Cert_X', and judges whether the signature data 1 is of the server itself (Step S603). If the authentication has failed (NO in Step S604), the server finishes the processing. If the authentication has succeeded (YES Step S604), the server authenticates the signature data 2 included in the Cert_X', using the public key PK_0010 of the memory cared 10 (Step S605).

If the authentication has failed (NO in Step S606), the server finishes the processing. If the authentication has succeeded (YES in Step S606), the server checks the service ID and the membership number included in the Cert_X', using the registration information (Step S705). If the memory card 10 is not registered (NO in Step S706), the server finishes the processing.

The memory card is certainly registered (YES in Step S706), the server reads the initial certification Cert_L of its own from the Cert managing unit (Step S707). The server transmits the initial certification Cert_L to the memory card 10 via the network 80 and the terminal device 20, and the memory card 10 receives the Cert_L (Step S708).

Upon receiving the initial certification Cert_L, the pubic key encryption unit 107 of the memory card 10 authenticates the signature data Sig_LCA included in the Cert_L, using the public key PK_CA of the certificate authority 70 (Step S709). If the result of the authentication is the failure (NO in Step S710), the memory card 10 finishes the processing. If the result of the authentication is the success (YES in Step S710), the public key encryption unit 107 reads the CRL from the user area 116 via the access control unit 109 (Step S711), and judges whether the ID_L included in the initial certification Cert_L is registered with the CRL (Step S712).

If it is judged that the ID_L is registered with the CRL (YES in Step S712), the memory card 10 finishes the processing. If it is judged that the ID_L is not registered with the CRL (NO in Step S712), the memory card 10 continues the processing.

Following the processing in Step S707, the public key encryption unit of each server generates a random number Cha_D (Step S713). Each server transmits the random number Cha_D to the memory card 10 via the network 80 and the terminal device 20, and the memory card 10 receives the random number Cha_D (Step S714).

Upon receiving the Cha_D, the public key encryption unit 107 of the memory card 10 calculates $$R = (rx, ry) = Cha\_D * G \text{ (Step S715)},$$

and calculates S by $$S \times Cha\_D = m + rx \times SK\_X \pmod{q} \text{ (Step S716)}.$$

Here, q is an order of the elliptic curve E, m is a message that the memory card 10 transmits to each server, and SK_X is a private key of memory card 10, corresponding to each application program, i.e., corresponding to each server.

The memory card 10 generates signature data Sig_d=(R1, S) from the obtained R1 and S (Step S717), and outputs the generated signature data Sig_d and the message m to each server, and the server receives the signature data Sig_d and the message m (Step S718).

The public key encryption unit of each server calculates $$m*G + rx*PK\_X,$$

and further calculates $$S*R1 \text{ (Step S719)}.$$

The public key encryption unit judges whether S*R1=m*G+rx*PK_X is satisfied to identify the memory card 10 that has transmitted the signature data Sig_d and the message m (Step S720). This equation is derivable from the following:

$$S*R1 = \{((m + rx \times SK\_X)/Cha\_D) \times Cha\_D\} * G$$
$$= (m + rx \times SK\_X) * G$$
$$= m*G + (rx \times SK\_X) * G$$
$$= m*G + rx*PK\_X.$$

If S*R1≠m*G+rx*PK_X (NO in Step S720), each server finishes the processing. If S*R1=m*G+rx*PK_X (YES in Step S720), each server continues the processing.

Meanwhile, after transmitting the Sig_d and them to each server in Step S718, the public key encryption unit 107 of the memory card 10 generates a random number Cha_E (Step S721), and transmits the generated random number Cha_E to each server via the terminal device 20 and the network 80. The communication unit of each server receives the Cha_E (Step S722).

Upon receiving the random number Cha_E via the control unit, the public key encryption unit of each server calculates $$R2 = (rx, ry) = Cha\_E * G \text{ (Step S723)},$$

and calculates S' by

S'×Cha_E=m'+rx×$K_S$_X(mod q) (Step S724). Here, m' is a message that each server transmits to the memory card 10, and $K_S$_X is a private key of each server.

Each server generates signature data Sig_e=(R2, S') from the obtained R2 and S' (Step S725), and outputs the generated signature data Sig_e and the message m' to the memory card 10. The memory card 10 receives the signature data Sig_e and the message m' (Step S726).

The public key encryption unit 107 of the memory card 10 calculates m'*G+rx*$K_P$_X (Step S731). Here, $K_P$_X is a public key of each server generated by calculating $K_P$_X=$K_S$_X*G.

The public key encryption unit 107 further calculates $$S'*R2 \text{ (Step S731)}.$$

The public key encryption unit 107 judges whether S*R2=m*G+rx*$K_P$_X is satisfied to identify the server that has transmitted the signature data Sig_e and the message m' (Step S732). This equation is derivable from the following:

$$S*R2 = \{((m' + rx \times K_S\_X)/Cha\_E) \times Cha\_E\} * G$$
$$= (m' + rx \times K_S\_X) * G$$
$$= m'*G + (rx \times K_S\_X) * G$$
$$= m'*G + rx*K_P\_X.$$

If S*R2≠m*G+rx*$K_P$_X (NO in Step S732), the memory card 10 finishes the processing. If S*R2=m*G+rx*$K_P$_X (YES in Step S732), the public key encryption unit 107 generates a random number "d" (Step S733), and generates Key_D=Gen(d, Y), using the random number "d" (Step S734). The memory card 10 transmits the generated Key_D to each server via the terminal device 20 and the network 80 by the public key encryption unit 107, and the communication unit of each server receives the Key_D (Step S735).

Upon receiving the Key_D, the public key encryption unit of each server generates a random number "e" (Step S736), and generates Key_E=Gen(e, Y), using the random number "e" (Step S737). The communication unit of each server transmits the generated Key_E to the memory card 10 via the terminal device 20 and the network 80, and the memory card 10 receives the Key_E (Step S738).

The public key encryption unit of each server generates Key_DE=Gen(e, Key_D)=Gen(e, Gen(d, Y)) (Step S741), using the random number "e" generated in Step S736 and the Key_D received in Step S735, and outputs the generated Key_DE to the control unit as a session key (Step S742). After that, each server continues the processing, returning to FIG. 22 or FIG. 23.

Meanwhile, upon receiving the Key_E in Step S738, the public key encryption unit 107 of the memory card 10 generates Key_DE=Gen (d, Key_E)=Gen(d, Gen(e, Y)) (Step S739), using the Key_E, and the random number "d" generated in Step S733, and considers the generated Key_DE as a session key (Step S740). After that, the memory card 10 continues the processing, returning to FIG. 22 or FIG. 23.

7. Authentication of Terminal Device 20

Figure 27:
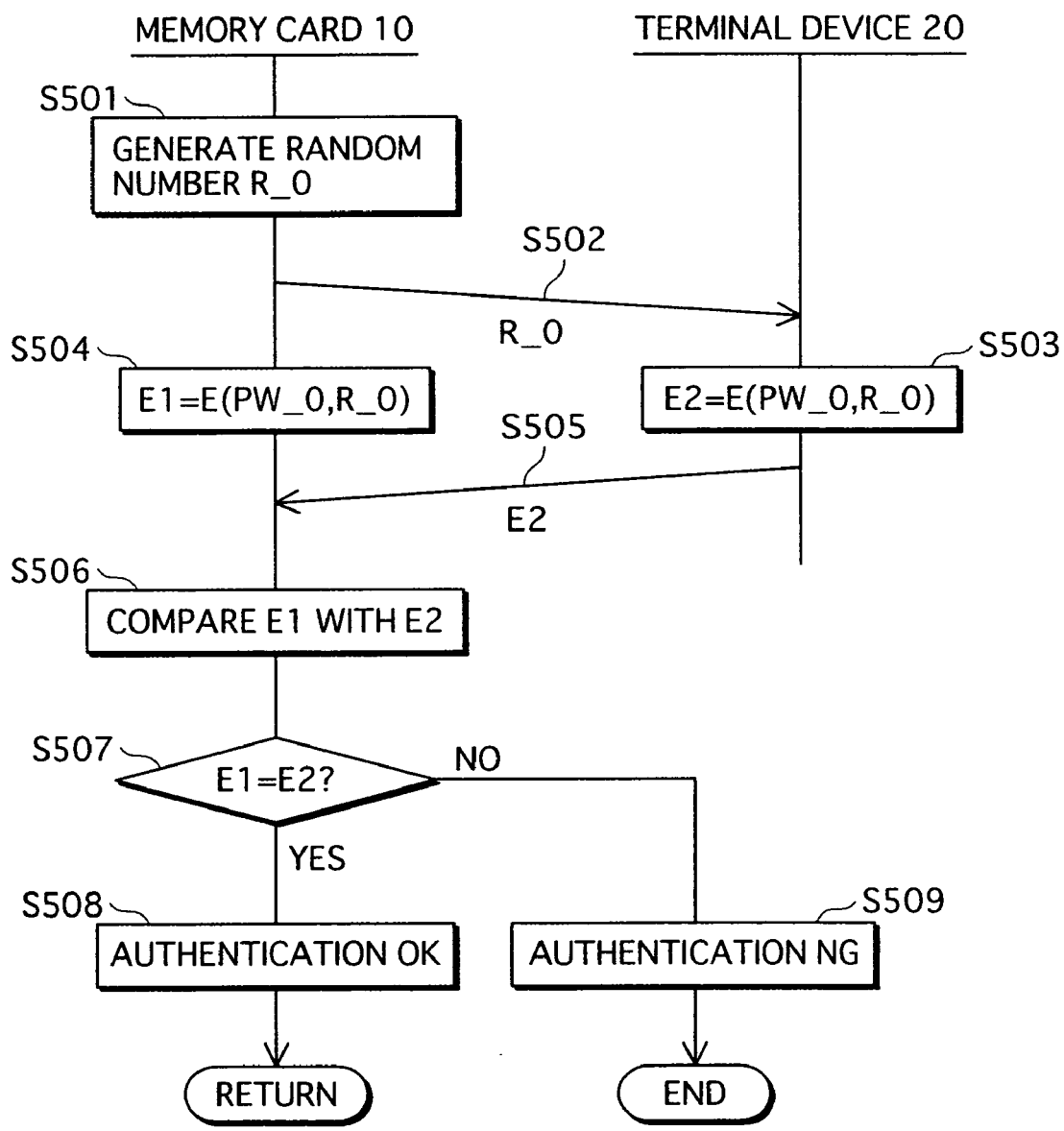
FIG. 27 is a flowchart showing operations performed by a memory card 10 for authenticate a terminal device 20.

FIG. 27 is a flowchart showing the authentication of the terminal device 20, performed by the memory card 10. Note that the operations shown in FIG. 27 are the details of Step S151 in the flowchart of FIG. 18, Step S303 in the flowchart of FIG. 22 and Step S404 in the flowchart of FIG. 23.

The authentication unit 106 of the memory card 10 generates a random number R_0 (Step S501). The authentication unit 106 holds therein the generated random number R_0 and also outputs the random number R_0 to the terminal device 20. The terminal device 20 receives the random number R_0 (Step S502).

Upon receiving the random number R_0, the authentication unit 205 of the terminal device 20 applies an encryption algorithm E to an authentication password PW_0 stored therein to generate an encrypted text E2, using the random number R_0 as an encryption key (Step S503). Meanwhile, the authentication unit 106 applies the encryption algorithm E to the authentication password PW_0 shared with the terminal device 20 to generate an encrypted text E1, using the random number R_0 generated in step S501 as an encryption key (Step S504).

The authentication unit 205 of the terminal device 20 outputs the encrypted text E2 generated in Step S503 to the memory card 10, and the memory card 10 receives the encrypted text E2 (Step S505). Upon receiving the encrypted text E2, the authentication unit 106 of the memory card compares the received encrypted text E2 with the encrypted text E1 generated in Step S504 (Step S506).

If the encrypted text E1 and the encrypted text E2 are the same (YES in Step S507), this means that the memory card 10 has succeeded in the authentication of the terminal device 20, and the authentication unit 106 outputs a signal indicating "authentication OK" to the command processing unit 105 (Step S508).

If the encrypted text E1 and the encrypted text E2 are not the same (NO in Step S507), this means that the memory card 10 has failed in the authentication of the terminal device 20, and the authentication unit 106 outputs a signal indicating "authentication NG" to the command processing unit 105 (Step S509), and finishes the processing.

<Other Modifications>

The present invention is described based on the embodiment above. However, the above-described is only one example for implementing the present invention, and the present invention is not limited to this. The following modifications are included in the present invention as well.

(1) In the embodiment above, the memory card 10 has a structure for generating a pair of a private key and a public key for each application program. However, this structure is not necessarily required. The memory card 10 may obtain a pair of a private key and a public key generated by an external device, such the certificate authority.

(2) In the embodiment above, the memory card 10 has a structure for storing the content key without encrypting the content key. However, this structure is not necessarily required. The memory card 10 may decrypt the encrypted content key with the session key, and encrypt the content key with another key before storing the content key.

(3) The embodiment above has a structure including in which the area for storing the encrypted content and the decryption unit for decrypting the encrypted content are included within the memory card 10. However, this structure is not necessarily required. The present invention may have a structure in which the area for storing the encrypted content and the decryption unit for decrypting the encrypted content are included within the terminal device 20. Any structure which uses devices other than the memory card 10 and the terminal device 20, and a portable medium for example is acceptable as long as it can realize the same functions as the above-described embodiment.

If this is the case, the present invention may be structured to securely perform the reception and the transmission of contents performed by the memory card 10 and the terminal device 20, and the reception and the transmission of contents performed by the memory card 10 and said other devices and the portable medium via a SAC.

(3) The embodiment above has a structure in which the memory card 10 is inserted in the terminal device 20 and the memory card 10 receives a service from each server via the terminal device 20. However, the present invention may have a structure in which the terminal device 20 establishes a SAC with each server by it self and receives a service from each server. Also, an LSI having the same functions as the memory card 10 may be implemented in the terminal device 20.

(4) The embodiment above has a structure for establishing a SAC by the public key cryptosystem. However, the present invention is not limited to this. In stead of the public key cryptosystem, the common key cryptosystem may be used.

If this is the case, generation/authentication of MAC (Message Authentication Code) using the common key cryptosystem is to be used instead of generation/authentication of signatures. The generation/authentication of MAC can be realized using a well-known technique disclosed by the Non-patent Document 1.

(5) In the embodiment above, the memory card 10 authenticates the signature data of each server, and stores the public key certification Cert_A, Cert_B, Cert_C and Cert_D received from the severs based on the result of the authentication. However, this structure is not necessarily required. The present invention includes a structure in which the memory card stores the public certifications without authenticating the signature data (i.e. omitting Step S165 in FIG. 18 and Step S166 in FIG. 19).

(6) The embodiment above has a structure in which the memory card 10 adds signature data of its own ("the signature data 2" in the embodiment) to the public key certification Cert_A, Cert_B, Cert_C or Cert_D obtained from each server to generate Cert_A', Cert_B', Cert_C' and Cert_D'. Accordingly, at the time of the service usage, each server can judges whether the Cert_A', Cert_B', Cert_C' or Cert_D' is the certification that the server has provided and whether the memory card is a valid device, by authenticating the signature data 1 and the signature data 2.

However, this structure is not necessarily required. The memory card 10 may store therein the public certifications Cert_A, Cert_B, Cert_C and Cert_D without performing any processing. If this is the case, each server authenticates only the signature data 1 to provide a service.

In the case of adding the signature data 2 as in the embodiment above, it is possible to have a structure in which the challenge-response authentication is omitted in the SAC establishment.

Also, the memory card 10 may select whether to add the signature data 2, or perform the challenge-response authentication in the SAC establishment, or perform both the addition of the signature data 2 and the challenge-response authentication in the SAC, and perform control in accordance with the selected method.

(7) In the embodiment above, the decoding of contents is performed by the playback unit 206 of the terminal device 20. However, the decoding may be performed within the memory card 10.

(8) In the embodiment above, the content server and the settlement server are respectively structured from independent two devices. However, the present invention includes a case where one server including the functions of the two servers is used. Also, the content server and the settlement server may communicate with each other via a LAN, and each server and the memory card 10 may communicate with each other via the network 80. Also, one device may have a plurality of functions respectively corresponding to the plurality of the application programs.

(9) The present invention may be methods shown by the above. Furthermore, the methods may be a computer program realized by a computer, and may be a digital signal of the computer program. Furthermore, the present invention may be a computer-readable recording medium apparatus such as a flexible disk, a hard disk, a CD-ROM (compact disk-read only memory), and MO (magneto-optical), DVD, a DVD-ROM, a DVD RAM, a BD (BluRay Disc) or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted on a electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to the recording medium apparatus, or by transferring the program or the digital signal via a network or the like, the program or the digital signal may be executed by another independent computer system.

Figure 28:
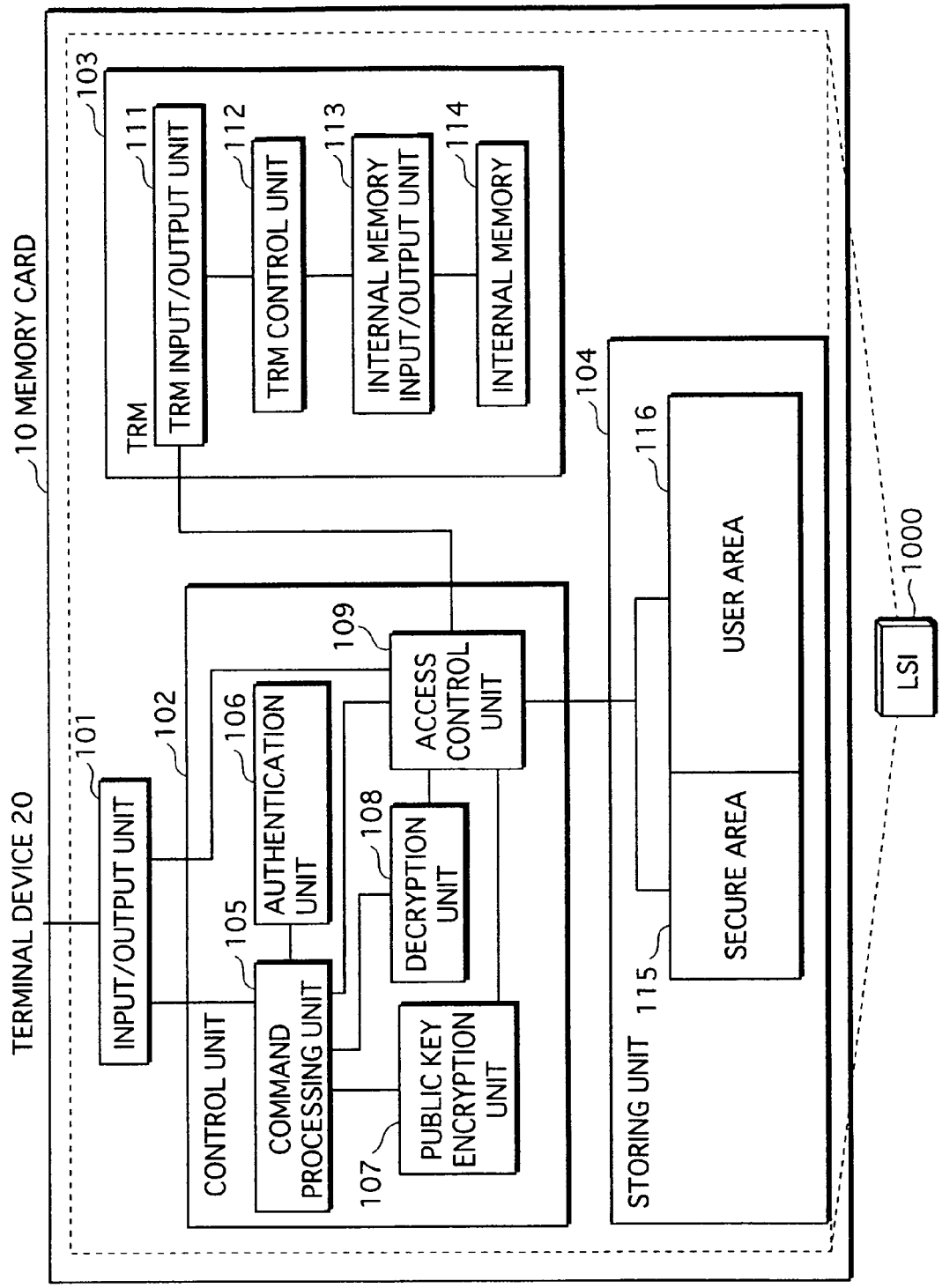
FIG. 28 shows a modification in which functions of a memory card 10 is realized with an LSI 1000.

(10) As FIG. 28 shows, all the function blocks of the memory card 10 in the embodiment above may be realized as an LSI 1000. Also, part of the function blocks may be realized as an LSI. Each of the functions may be separately realized as on chip, or apart or all the functions may be realized as one chip. Either of the LSIs described here may be called an IC, a system LSI, a super LSI, or an ultra LSI, depending on the degree of integration.

Furthermore, the integrated circuits are not limited to being LSI, but may be implemented as special-purpose circuits or general-purpose circuits. An FPGA (field programmable gate array) that is programmable after manufacturing the LSI may be used, or a re-configurable processor in which the connection of the circuit cells and the settings in the LSI are re-configurable may be used.

Furthermore, if technology for an integrated circuit that replaces LSIs appears due to advances in or derivations from semiconductor technology, that technology may be used for integration of the functional blocks. Bio-technology is one possible application.

(11) Also, The present invention may be any combination of the above-described embodiments and modifications.

INDUSTRIAL APPLICABILITY

The present invention can be used in industries where digital contents such as movies and music are distributed via broadcasting and a network, as a system with which the user uses a plurality of the service providers.

The invention claimed is:

1. An information processing device for receiving services from at least one server connected thereto via a network, the information processing device using an application program from among a plurality of application programs that securely communicates with the at least one server, the information processing device comprising:
    a storing unit for storing the plurality of application programs;
    a private key generating unit operable to generate private keys respectively associated with the plurality of application programs stored in the storing unit, and write the generated private keys in the storing unit;
    a public key generating unit operable to generate public keys respectively corresponding to the private keys;
    a public key transmitting unit operable to transmit the generated public keys to the at least one server from which the information processing device receives the services using the plurality of application programs respectively corresponding to the transmitted public keys;
    a public key certification acquiring unit operable to acquire a plurality of public key certifications each including a corresponding one of the public keys from the at least one server and write the public key certifications in the storing unit; and
    a program execution unit operable to read one of the plurality of application programs and execute the read application program,
    wherein each of the plurality of application programs includes:
    a key sharing program for securely sharing a shared key with the at least one server based on a public key cryptosystem;
    a communication program for receiving and transmitting data encrypted based on the shared key from and to the at least one server; and
    an encryption program for encrypting data to be transmitted and decrypting received data,
    wherein the program execution unit reads, from the storing unit, one of the private keys associated with the read application program and the corresponding public key,
    wherein the program execution unit executes the key sharing program, the communication program, and the encryption program to: securely share the shared key with the at least one server based on the read private key and the read corresponding public key by using the public key cryptosystem; transmit and receive data encrypted based on the shared key to and from the at least one server; encrypt data to be transmitted to the at least one server; and decrypt data received from the at least one server,
    wherein the storing unit further stores an initial private key that is unique to the information processing device, and an initial certification that includes a public key corresponding to the initial private key and signature data issued by a certificate authority relating to the public key corresponding to the initial private key, wherein the public key transmitting unit uses the initial private key and the initial certification to securely transmit the public keys to the at least one server, wherein the public key certification acquiring unit uses the initial private key and the initial certification to securely receive the public key certifications from the at least one server, and
    wherein the public key certification acquiring unit judges whether to add signature data of the information processing device, and if judging affirmatively, generates the signature data based on the initial private key, adds the generated signature data to the public key certifications, and stores the public key certifications in the storing unit.

2. The information processing device of claim 1, wherein the public key generating unit generates a plurality of public keys SK respectively corresponding to the private keys by calculating SK*G(mod p), based on an elliptic curve $y_2=x_3+ax+b$, a prime number p, and a base point G on the elliptic curve, the key sharing program shares the shared key based on an elliptic curve cryptosystem as the public key cryptosystem, and the program execution unit uses the elliptic curve cryptosystem to share the shared key.

3. The information processing device of claim 1, wherein the private key generating unit receives a plurality of private keys d of an RSA cryptosystem respectively corresponding to the application programs, the public key generating unit generates a plurality of public keys (N, e) respectively corresponding to the private keys by acquiring a pair of prime numbers (P, Q), calculating N=PQ, and further calculating e from ed≡mod(P−1)(Q−1), the key sharing program shares the shared key based on the RSA cryptosystem as the public key cryptosystem, and the program execution unit uses the RSA cryptosystem to share the shared key.

4. The information processing device of claim 1, wherein the information processing device is a memory card comprising a CPU, and the memory card is configured to attach to a terminal device that is connected to the network, to receive the services from the at least one server via the terminal device.

5. The information processing device of claim 4, wherein the storing unit includes:

an internal memory that is tamper resistant and accessible by only the CPU of the memory card;
an authentication area requiring authentication for an access by the terminal device; and
a non-authentication area not requiring authentication for an access by the terminal device.

6. The information processing device of claim 5, wherein the initial private key is stored in the internal memory,
the private keys are stored in the authentication area, and
the initial certification and the public key certification are stored in the non-authentication area.

7. A content providing system including a server and an information processing device that is connected to the server via a network, the server comprising:
a content storing unit for storing content; and
a content providing unit operable to securely transmit the content to the information processing device, and the information processing device comprising:
a storing unit for storing a plurality of application programs;
a private key generating unit operable to generate private keys respectively associated with the plurality of application programs stored in the storing unit, and write the generated private keys in the storing unit;
a public key generating unit operable to generate public keys respectively corresponding to the private keys;
a public key transmitting unit operable to transmit the generated public keys to the at least one server from which the information processing device receives the services using the plurality of application programs respectively corresponding to the transmitted public keys;
a public key certification acquiring unit operable to acquire a plurality of public key certifications each including a corresponding one of the public keys from the at least one server and write the public key certifications in the storing unit; and
a program execution unit operable to read one of the plurality of application programs and execute the read application program,
wherein each of the plurality of application programs includes:
a key sharing program for securely sharing a shared key with the at least one server based on a public key cryptosystem;
a communication program for receiving and transmitting data encrypted based on the shared key from and to the at least on server; and
an encryption program for encrypting data to be transmitted and decrypting received data, wherein the program execution unit reads, from the storing unit, one of the private keys associated with the read application program and the corresponding public key,
wherein the program execution unit executes the key sharing program, the communication program, and the encryption program to: securely share the shared key with the at least one server based on the read private key and the read corresponding public key by using the public key cryptosystem; transmit and receive data encrypted based on the shared key to and from the at least one server; encrypt data to be transmitted to the at least one server; decrypt data received from the at least one server,
wherein the storing unit further stores an initial private key that is unique to the information processing device, and an initial certification that includes a public key corresponding to the initial private key and signature data issued by a certificate authority relating to the public key corresponding to the initial private key,
wherein the public key transmitting unit uses the initial private key and the initial certification to securely transmit the public keys to the at least one server,
wherein the public key certification acquiring unit uses the initial private key and the initial certification to securely receive the public key certifications from the at least one server, and
wherein the public key certification acquiring unit judges whether to add signature data of the information processing device, and if judging affirmatively, generates the signature data based on the initial private key, adds the generated signature data to the public key certifications, and stores the public key certifications in the storing unit.

8. An integrated circuit included in an information processing device for receiving services from at least one server connected thereto via a network, using an application program from among a plurality of application programs that securely communicates with the at least one server, the integrated circuit comprising:

a storing unit for storing the plurality of application programs;
a private key generating unit operable to generate private keys respectively associated with the plurality of application programs stored in the storing unit, and write the generated private keys in the storing unit;
a public key generating unit operable to generate public keys respectively corresponding to the private keys;
a public key transmitting unit operable to transmit the generated public keys to the at least one server from which the information processing device receives the services using the plurality of application programs respectively corresponding to the transmitted public keys;
a public key certification acquiring unit operable to acquire a plurality of public key certifications each including a corresponding one of the public keys from the at least one server and write the public key certifications in the storing unit; and
a program execution unit operable to read one of the plurality of application programs and execute the read application program,
wherein each of the plurality of application programs includes:
a key sharing program for securely sharing a shared key with the at least one server based on a public key cryptosystem;

a communication program for receiving and transmitting data encrypted based on the shared key from and to the at least one server; and an encryption program for encrypting data to be transmitted and decrypting received data, wherein the program execution unit reads, from the storing unit, one of the private keys associated with the read application program and the corresponding public key, wherein the program execution unit executes the key sharing program, the communication program, and the encryption program to: securely share the shared key with the at least one server based on the read private key and the read corresponding public key by using the public key cryptosystem; transmit and receive data encrypted based on the shared key to and from the at least one server; encrypt data to be transmitted to the at least one server; and decrypt data received from the at least one server, wherein the storing unit further stores an initial private key that is unique to the information processing device, and an initial certification that includes a public key corresponding to the initial private key and signature data issued by a certificate authority relating to the public key corresponding to the initial private key, wherein the public key transmitting unit uses the initial private key and the initial certification to securely transmit the public keys to the at least one server, wherein the public key certification acquiring unit uses the initial private key and the initial certification to securely receive the public key certifications from the at least one server, and wherein the public key certification acquiring unit judges whether to add signature data of the information processing device, and if judging affirmatively, generates the signature data based on the initial private key, adds the generated signature data to the public key certifications, and stores the public key certifications in the storing unit.

9. A control method for controlling an information processing device for receiving services from at least one server connected thereto via a network, the information processing device using an application program from among a plurality of application programs that securely communicates with the at least one server, wherein the information processing device includes a storing unit for storing the plurality of application programs, each of the plurality of application programs including:

a key sharing program for securely sharing a shared key with the at least one server based on a public key cryptosystem;

a communication program for receiving and transmitting data encrypted based on the shared key from and to the at least one server; and an encryption program for encrypting data to be transmitted and decrypting received data, wherein, the control method comprises:

a private key generating step of generating private keys respectively associated with the plurality of application programs stored in the storing unit, and writing the generated private keys in the storing unit;

a public key generating step of generating public keys respectively corresponding to the private keys;

a public key transmitting step of transmitting the generated public keys to the at least one server from which the information processing device receives the services using the plurality of application programs respectively corresponding to the transmitted public keys;

a public key certification acquiring step of acquiring a plurality of public key certifications each including a corresponding one of the public keys from the at least one server and writing the public key certifications in the storing unit; and a program execution step of reading one of the plurality of application programs and executing the read application program, wherein the program execution step reads, from the information processing device, one of the private keys associated with the read application program and the corresponding public key, wherein the program execution step executes the key sharing program, the communication program, and the encryption program to: securely share the shared key with the at least one server based on the read private key and the read corresponding public key by using the public key cryptosystem; transmit and receive data encrypted based on the shared key to and from the at least one server; encrypt data to be transmitted to the at least one server; and decrypt data received from the at least one server, wherein the storing unit further stores an initial private key that is unique to the information processing device, and an initial certification that includes a public key corresponding to the initial private key and signature data issued by a certificate authority relating to the public key corresponding to the initial private key, wherein the public key transmitting step uses the initial private key and the initial certification to securely transmit the public keys to the at least one server, wherein the public key certification acquiring step uses the initial private key and the initial certification to securely receive the public key certifications from the at least one server, and wherein the public key certification acquiring step judges whether to add signature data of the information processing device, and if judging affirmatively, generates the signature data based on the initial private key, adds the generated signature data to the public key certifications, and stores the public key certifications in the storing unit.

10. A non-transitory computer recording medium having recorded thereon a computer program for use by an information processing device for receiving services from at least one server connected thereto via a network, the information processing device using an application program from among a plurality of application programs that securely communicates with the at least one server, wherein the information processing device includes a storing unit for storing the plurality of application programs, each of the plurality of application programs including:

a key sharing program for securely sharing a shared key with the at least one server based on a public key cryptosystem;

a communication program for receiving and transmitting data encrypted based on the shared key from and to the at least one server; and an encryption program for encrypting data to be transmitted and decrypting received data, wherein when executed by the information the processing device, the computer program causes the information processing device to perform a method comprising:

a private key generating step of generating private keys respectively associated with the plurality of application programs stored in the storing unit, and writing the generated private keys in the storing unit;

a public key generating step of generating public keys respectively corresponding to the private keys;

a public key transmitting step of transmitting the generated public keys to the at least one server from which the information processing device receives the services using the plurality of application programs respectively corresponding to the transmitted public keys;

a public key certification acquiring step of acquiring a plurality of public key certifications each including a corresponding one of the public keys from the at least one server and writing the public key certifications in the storing unit; and a program execution step of reading one of the plurality of application programs and executing the read application program, wherein the program execution step reads, from the information processing device, one of the private keys associated with the read application program and the corresponding public key, wherein the program execution step executes the key sharing program, the communication program, and the encryption program to: securely share the shared key with the at least one server based on the read private key and the read corresponding public key by using the public key cryptosystem; transmit and receive data encrypted based on the shared key to and from the at least one server; encrypt data to be transmitted to the at least one server; and decrypt data received from the at least one server, wherein the storing unit further stores an initial private key that is unique to the information processing device, and an initial certification that includes a public key corresponding to the initial private key and signature data issued by a certificate authority relating to the public key corresponding to the initial private key, wherein the public key transmitting step uses the initial private key and the initial certification to securely transmit the public keys to the at least one server, wherein the public key certification acquiring step uses the initial private key and the initial certification to securely receive the public key certifications from the at least one server, and wherein the public key certification acquiring step judges whether to add signature data of the information processing device, and if judging affirmatively, generates the signature data based on the initial private key, adds the generated signature data to the public key certifications, and stores the public key certifications in the storing unit.

\* \* \* \* \*